US008611240B2

(12) United States Patent
Anderson et al.

(10) Patent No.: US 8,611,240 B2
(45) Date of Patent: Dec. 17, 2013

(54) MANAGING WIRELESS COMMUNICATIONS

(75) Inventors: Nicholas William Anderson, Warmley (GB); Gordon Peter Young, Shipston-on-Sour (GB); Richard Charles Burbidge, Hook (GB)

(73) Assignee: BlackBerry Limited, Waterloo, Ontario (CA)

( * ) Notice: Subject to any disclaimer, the term of this patent is extended or adjusted under 35 U.S.C. 154(b) by 403 days.

(21) Appl. No.: 12/946,535

(22) Filed: Nov. 15, 2010

(65) Prior Publication Data

US 2012/0120815 A1    May 17, 2012

(51) Int. Cl.
*G01R 31/08* (2006.01)
(52) U.S. Cl.
USPC ........................................................ 370/252
(58) Field of Classification Search
USPC ........................................................ 370/252
See application file for complete search history.

(56) References Cited

U.S. PATENT DOCUMENTS

| 5,373,506 | A | 12/1994 | Tayloe et al. |
| 2007/0259673 | A1 | 11/2007 | Willars et al. |
| 2008/0046132 | A1 | 2/2008 | Dalsgaard et al. |
| 2008/0181127 | A1 | 7/2008 | Terry et al. |
| 2009/0203376 | A1 | 8/2009 | Sambhwani et al. |
| 2009/0239498 | A1* | 9/2009 | Lee et al. .................. 455/404.1 |
| 2011/0287738 | A1 | 11/2011 | Peisa et al. |

FOREIGN PATENT DOCUMENTS

| EP | 1613107 A2 | 1/2006 |
| EP | 1845668 | 10/2007 |
| EP | 1915010 | 4/2008 |
| WO | WO2007082934 A1 | 7/2007 |
| WO | WO2007149732 A1 | 12/2007 |
| WO | WO2009117634 A1 | 9/2009 |
| WO | WO2009132290 A3 | 1/2010 |

OTHER PUBLICATIONS

International Search Report issued in International Application No. PCT/EP2011/070187 on Feb. 13, 2012; 4 pages.
"3GPP TS 23.401 V10.1.0; 3rd Generation Partnership Project; Technical Specification Group Services and System Aspects; General Packet Radio Service (GPRS) enhancements for Evolved Universal Terrestrial Radio Access Network (E-UTRAN) access (Release 10); Sep. 29, 2010; 271 pages".

(Continued)

*Primary Examiner* — Sai-Ming Chan
(74) *Attorney, Agent, or Firm* — Fish & Richardson P.C.

(57) ABSTRACT

A wireless network, such as an LTE ("Long-Term Evolution") network, may be configured to monitor a communications interface to set an inactivity timer that, in turn, sets the operating mode of a communications interface. The operating mode may comprise a time-domain reception pattern of the wireless device. A wireless device may monitor a communications interface that includes at least a first logical channel (for example for a first application) and a second logical channel (for example for a second application). Based on monitoring the communications interface, a first activity state for the first logical channel may be determined. Also, based on monitoring the communications interface, a second activity state (e.g., an activity status) for the second logical channel may be determined. An inactivity timer used by the communications interface may be set to a first value or a second value based on the first and second activity states. The battery life of a wireless device may be preserved by setting an inactivity timer responsive to the manner in which the wireless device is being used.

17 Claims, 12 Drawing Sheets

(56) References Cited

OTHER PUBLICATIONS

Office Action issued in U.S. Appl. No. 12/946,617 on Jan. 16, 2013; 6 pages.
International Search Report and Written Opinion of the International Searching Authority issued in International Application No. PCT/EP2011/069941 on Dec. 16, 2011; 13 pages.
International Search Report and Written Opinion of the International Searching Authority issued in International Application No. PCT/EP2011/069938 on Dec. 16, 2011; 12 pages.
International Preliminary Report on Patentability issued in International Application No. PCT/EP2011/069941 on May 21, 2013; 13 pages.
International Preliminary Report on Patentability issued in International Application No. PCT/EP2011/069938 on May 21, 2013; 13 pages.
International Preliminary Report on Patentability issued in International Application No. PCT/EP2011/070187 on May 21, 2013; 10 pages.
Office Action issued in U.S. Appl. No. 13/297,073 on Jun. 18, 2013; 9 pages.
Office Action issued in U.S. Appl. No. 12/946,617 on Apr. 25, 2013; 7 pages.

\* cited by examiner

FIG. 11

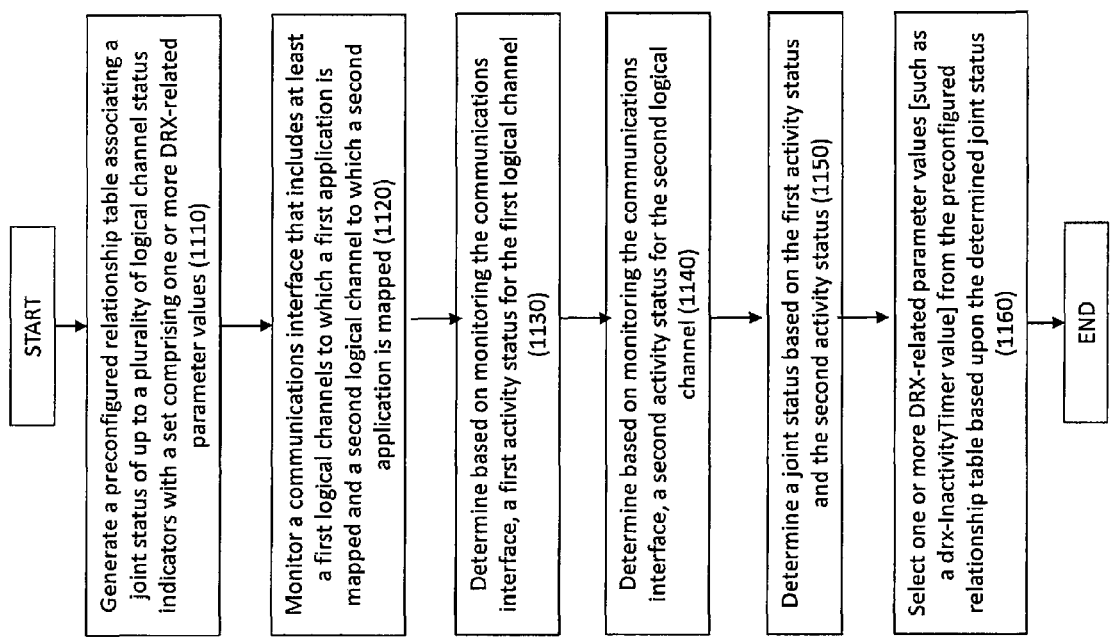

MANAGING WIRELESS COMMUNICATIONS

BACKGROUND

This document relates to wireless communications in wireless communication systems.

Wireless communication systems can include a network of one or more base stations to communicate with one or more wireless devices such as fixed and mobile wireless communication devices, mobile phones, or laptop computers with wireless communication cards that are located within coverage areas of the wireless systems. Base stations can emit radio signals that carry data such as voice data and other data content to wireless devices. A base station can transmit a signal on a forward link (FL), also called a downlink (DL), to one or more wireless devices. A wireless device can transmit a signal on a reverse link (RL), also called an uplink (UL), to one or more base stations. Further, a wireless communication system can include a core network that connects to a radio access network that includes the base stations.

A wireless device can use one or more different wireless technologies such as orthogonal frequency-division multiplexing (OFDM) or code division multiple access (CDMA) based technologies for communications. Various examples of standards for wireless technologies include Long-Term Evolution (LTE), Universal Mobile Telecommunications System (UMTS), CDMA2000 1x, Worldwide Interoperability for Microwave Access (WiMAX), Global System for Mobile Communications (GSM), and General Packet Radio Service (GPRS). In some implementations, a wireless communication system can include multiple networks using different wireless technologies. A wireless device can be referred to as user equipment (UE), access terminal (AT), a mobile station (MS), a mobile device (MD) or a subscriber station (SS). A base station can be referred to as an access point (AP) or access network (AN). Examples of base stations include Node-B base stations and eNode-B base stations.

BRIEF DESCRIPTION OF THE DRAWINGS

FIG. 11 shows a schematic representation of a preconfigured relationship table 1600 describing a relationship between the joint status of one or more logical channel data activity status or flags and one or more DRX-related configuration parameters.

FIG. 12 is a flow chart illustrating an example method for adjusting a DRX-related parameter in response to logical channel activity.

DETAILED DESCRIPTION

A wireless device preserves battery life by interfacing with a network to selectively transition between different listening states. Specifically, a wireless device and the network may coordinate use of different Discontinuous Reception (DRX) parameter values. The different DRX parameter values are determined by monitoring a communications interface with multiple logical channels associated with a communication between a wireless communication device and a network. The different logical channels may be configured to support different application profiles and behavior so that a first channel may support stringent traffic handling or transfer requirements while a second channel may support less stringent requirements. An activity status may be identified for each of the logical channels, for example, indicating whether a particular logical channel has been used in the last 100 ms. A first value for the DRX parameter value may then be applied based upon identifying a first activity status of two or more logical channels and a second value for the DRX parameter based upon identifying a second activity status of the two or more logical channels, where the DRX parameter value affects a reception pattern of the wireless communication device. Thus, a latency-sensitive reception pattern more responsive to demanding QoS applications may be used when appropriate while a battery conserving reception pattern may be used when only low-bandwidth or more-latency-tolerant messaging applications are being used.

Figure 1:
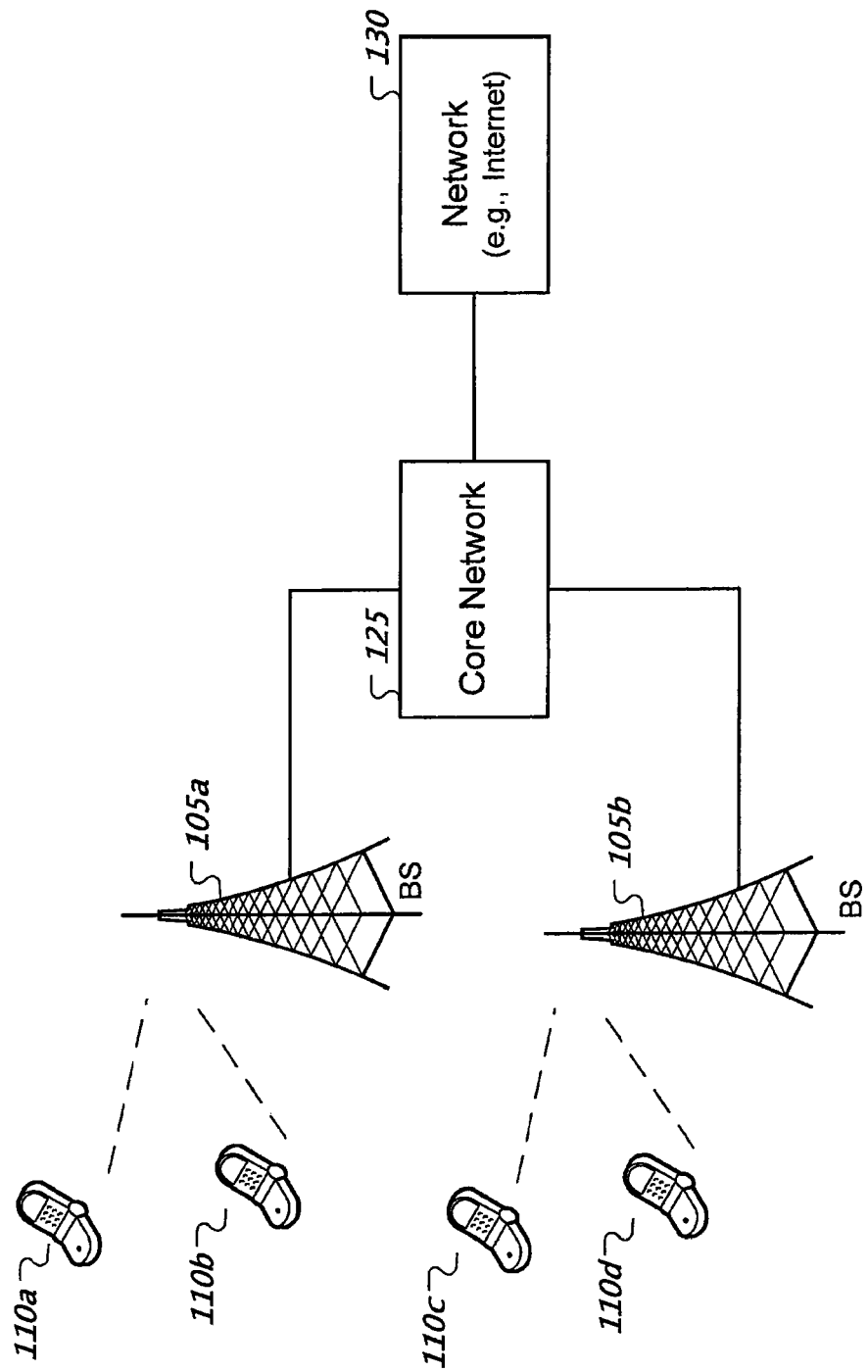
FIG. 1 shows an example of a wireless communication system.

FIG. 1 shows an example of a wireless communication system. A wireless communication system includes one or more radio access networks 140 and one or more core networks 125. Radio access network 140 includes one or more base stations (BSs) 105a, 105b. The system may provide wireless services to one or more wireless devices 110a, 110b, 110c, and 110d. Base stations 105a and 105b can provide wireless service to wireless devices 110a-d in one or more wireless sectors. In some implementations, base stations 105a, 105b use directional antennas to produce two or more directional beams to provide wireless coverage in different sectors. A core network 125 communicates with one or more base stations 105a and 105b. In some implementations, a core network 125 is attached to a radio access network including one or more base stations 105a and 105b. The core network 125 may include communication equipment such as one or more servers. In some implementations, the core network 125 is in communication with a network that provides connectivity with other wireless communication systems and wired communication systems. The wireless communication system may communicate with wireless devices 110a-d using a wireless technology such as one based on orthogonal frequency division multiplexing (OFDM), orthogonal frequency division multiple access (OFDMA), Single Carrier Frequency Division Multiple Access (SC-FDMA), Discrete Fourier Transform Spread Orthogonal Frequency Division Multiplexing (DFT-SOFDM), space-division multiplexing (SDM), frequency-division multiplexing (FDM), time-division multiplexing (TDM), code division multiplexing (CDM), or others. The wireless communication system may transmit information using medium access control (MAC) and Physical (PHY) layers. The techniques and systems described herein may be implemented in various wireless communication systems such as a system based on Long Term Evolution (LTE) Global System for Mobile Communication (GSM) protocols, Code Division Multiple Access (CDMA) protocols, Universal Mobile Telecommunications System (UMTS), Unlicensed Mobile Access (UMA), or others.

Wireless devices, such as smartphones, may generate and consume significant amounts of data over a wide variety of data traffic types and services. Smartphone devices may be viewed as computing platforms with wireless connectivity, capable of running a wide-ranging variety of applications and services that are either pre-installed by the device manufacturer or installed by the user according to the user's specific usage requirements. The applications may originate from a wide-ranging group of sources such as software houses, manufacturers, and third party developers.

Wireless networks may distinguish between user-plane traffic and control-plane traffic. Various examples of user-plane traffic and services carried by wireless networks include voice, video, internet data, web browsing sessions, upload/download file transfer, instant messaging, e-mail, navigation services, RSS feeds, and streaming media. Control-plane traffic signaling may be used to enable or support transfer of the user plane data via the wireless network, including, for example, mobility control and radio resource control functionality. Various examples of control plane traffic include core-network mobility and attachment control, (e.g., Non-Access Stratum (NAS) signaling), radio access network control (e.g., Radio Resource Control (RRC)), and physical layer control signaling such as may be used to facilitate advanced transmission techniques and for radio link adaptation purposes.

Applications, communicating via a wireless network, may utilize Internet-based protocols to achieve a desired effect when provisioning for a specific service. For example, a navigation application may utilize FTP and TCP for file transfer of mapping data from a server to a device. The navigation application may use periodic keep-alive signaling (e.g., exchanging PING messages) towards the navigation server to maintain an application-level connection in the presence of intermediary network nodes such as stateful firewalls. Similarly, an e-mail application may use a synchronization protocol to align mailbox contents on a wireless device with those in the e-mail server. The e-mail application may use a periodic server polling mechanism to check for new e-mail.

Wireless network designs are influenced by the data demands produced by various applications and associated data traffic distributions. For example, the amount and timing of data traffic may vary (e.g., bursty communications). To adapt, wireless communication networks may include dynamic scheduling such that a quantity of assigned shared radio resources may be varied in rapid response to data demand (e.g., data buffer status). Such dynamic scheduling can operate on a time scale of one to two or three milliseconds. At a time scale above this (e.g., operating in the region of 100 milliseconds to several seconds), wireless networks can use a state-machine-oriented process or other system reconfiguration process to adapt a radio connection state or sub-state to the degree of observed traffic activity. Radio connection states or sub-states may differ both in the degree of connectivity offered and in terms of the amount of battery power consumed by a wireless device.

A connectivity level can be characterized as representing connectivity attributes, such as location granularity, assigned resources, preparedness, and interfaces or bearers established. A location granularity attribute may be the accuracy to which a wireless network can track the current location of a wireless device (e.g., to the cell level for more active devices, or to only a group of cells for less active devices). Examples of assigned resource attributes include the presence, absence, type or amount of radio transmission resources available to the wireless device for performing communication, as a function of expected activity level.

A preparedness attribute is an ability of a wireless device to receive or transmit information. The power consumed by wireless devices may reflect a function of an ability of a wireless device (or readiness) to transmit or receive. For example, a wireless device can activate its receiver in order to receive downlink communication from a base station at any given instant, which may cause higher power consumption and battery drain. To save power, a mode referred to as discontinuous reception (DRX) may be used. In DRX, the wireless device can place its receiver in a sleep mode, e.g., turning off its receiver at certain times. The base station uses knowledge of a UE's DRX pattern (e.g., sequence of wake-up intervals of the device) when determining times to transmit to a wireless device that is in a DRX mode. For example, a base station determines a time in which the wireless device will be actively listening for a transmission. The activity cycle of a DRX pattern can vary as a function of an assigned radio connection state or sub-state.

End-to-end communications (e.g., from a wireless device to a core network gateway or egress node towards to the Internet) can require that user-specific connections, or bearers, are established between participating network nodes or entities. User-plane connectivity through a radio access network and a core network can require the establishment of one or more network interfaces between various pairs of network nodes. The establishment of one or more of these network interfaces can be associated with a radio connection state or sub-state as a function of the current activity level.

Figure 2:
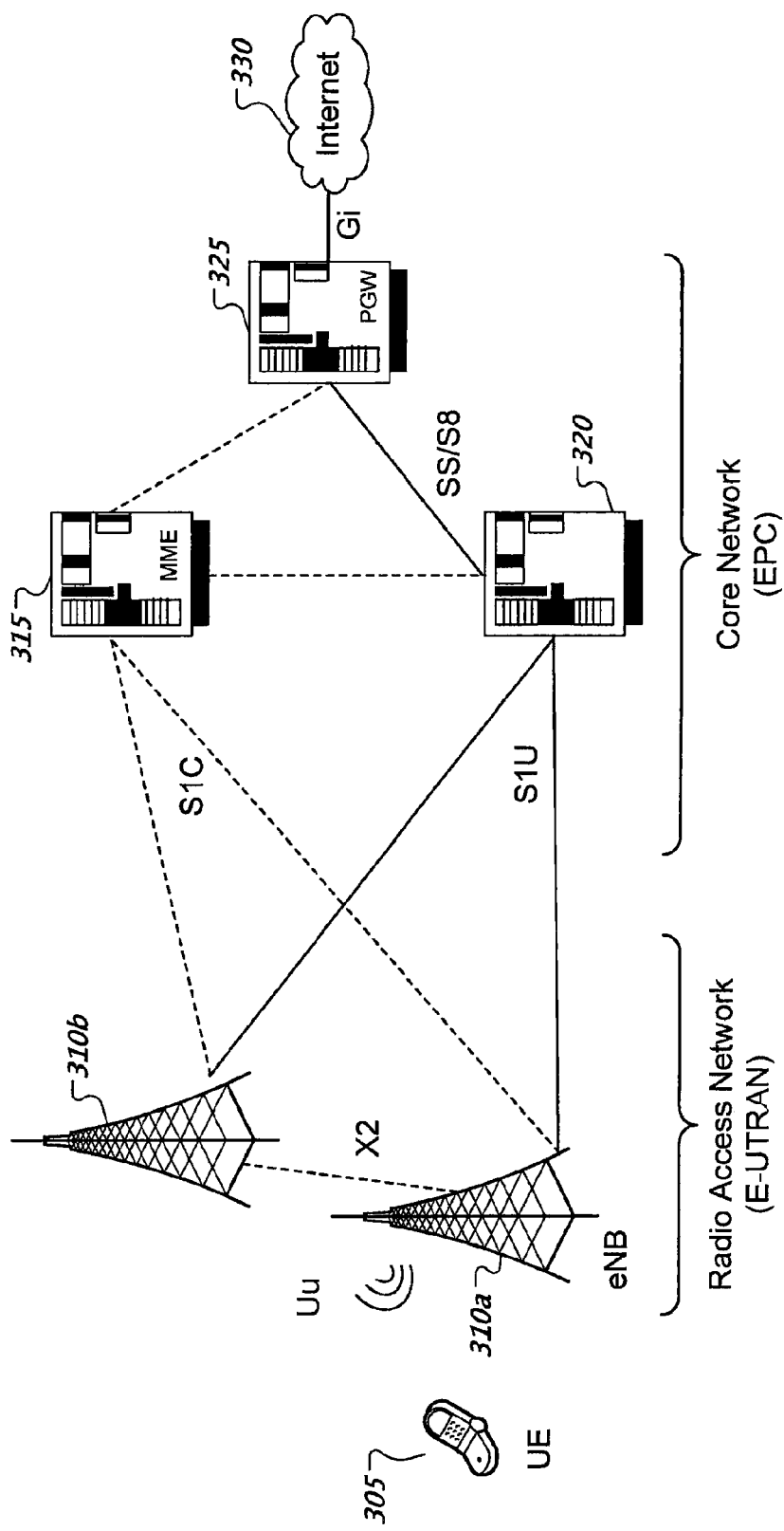
FIG. 2 shows an example of a wireless system architecture based on Long Term Evolution (LTE).

FIG. 2 shows an example of a wireless system architecture based on Long Term Evolution (LTE). A wireless communication system based on LTE can include a core network called an Evolved Packet Core (EPC) and a LTE Radio Access Network, e.g., evolved UTRAN (E-UTRAN). The core network provides connectivity to an external network such as the Internet 330. The system includes one or more base stations such as eNode-B (eNB) base stations 310*a* and 310*b* that provide wireless service(s) to one or more devices such as UEs 305.

An EPC-based core network can include a Serving Gateway (SGW) 320, a Mobility Management Entity (MME) 315, and a Packet Gateway (PGW) 325. The SGW 320 can route traffic within a core network. The MME 315 is responsible for core-network mobility control attachment of the UE 305 to the core network and for maintaining contact with idle mode UEs. The PGW 325 is responsible for enabling the ingress/egress of traffic from/to the Internet 330 or other data network. The PGW 325 can allocate IP addresses to the UEs 305.

A LTE-based wireless communication system has network interfaces defined between system elements. The network interfaces include the Uu interface defined between a UE and an eNB, the S1U user-plane interface defined between an eNB and a SGW, the S1C control-plane interface defined between an eNB and a MME (also known as S1-MME), and the S5/S8 interface defined between a SGW and a PGW. Note that the combination of S1U and S1C is often simplified to "S1."

Figure 3:
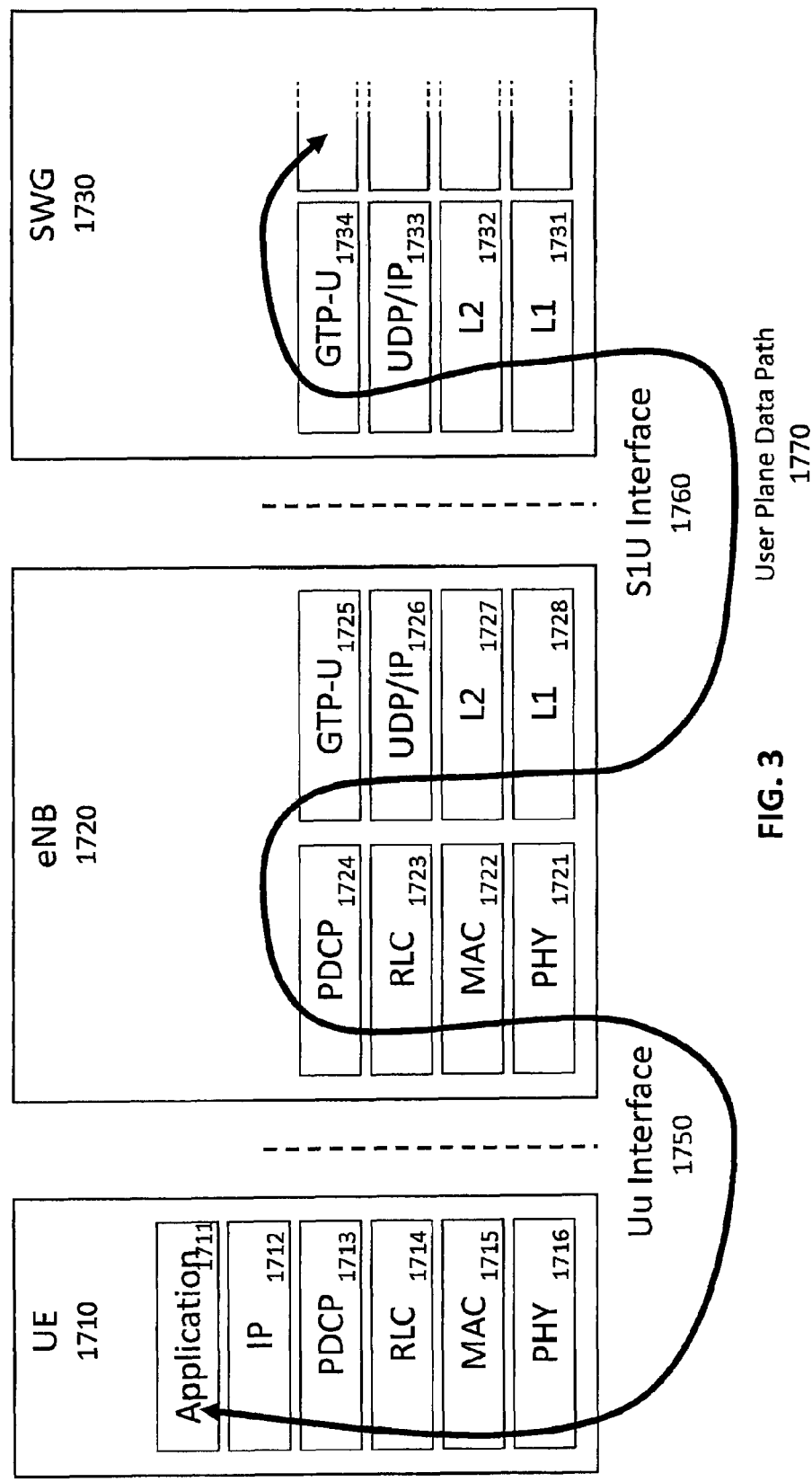
FIG. 3 shows a protocol stack architecture for an LTE system for user plane transfer of data over a Uu interface and an S1U interface.

FIG. 3 shows a protocol stack architecture for an LTE system for user plane transfer of data over a Uu interface 1750 and an S1U interface 1760. A user plane data path 1770 transfers data packets to/from an application 1711 resident in UE 1710, or possibly resident in another terminal device (not shown in the figure) that may be connected to the UE, through eNB 1720 and onwards through SWG 1730, traversing Uu interface 1750 and S1U interface 1760. Application 1711 generates or receives data packets via the UE protocol stack comprising a number of protocol layers that may include Internet Protocols (IP) 1712, a Packet Data Convergence Protocol (PDCP) 1713, a Radio Link Control (RLC) protocol 1714, a Medium Access Control (MAC) protocol (1715) and a Physical Layer (PHY) protocol 1716. Note that the Internet Protocols (IP) layer 1712 may further comprise a number of layers for example Transmission Control Protocol (TCP), User Datagram Protocol (UDP), and Internet Protocol (IP). Data packets generated by application 1711 are processed by each of the UE protocol stack components 1711, 1712, 1713, 1714, 1715 and 1716 in order to produce signals for transmission over Uu interface 1750. Signals arriving at UE 1710 over Uu interface 1750 are processed by each of the UE protocol stack components 1716, 1715, 1714, 1713, and 1712 before arriving at application 1711. Signals transmitted by UE 1710 over Uu interface 1750 are received by eNB 1720 and are processed via corresponding protocol stack components 1721, 1722, 1723, and 1724. eNB 1720 relays and converts data from PDCP 1724 to a GPRS Tunneling Protocol User Plane (GTP-U) 1725 on the S1U interface side of eNB 1720. Further processing of data from GTP-U 1725 is performed via User Datagram Protocol UDP/IP 1726, Layer 2 protocol 1727 and L1 protocol 1728 to enable the formation of signals that are transferred over SW interface 1760 to SGW 1730. A reverse path for signals received by eNB 1720 from SGW 1730 is also provided, involving processing steps through protocol stack components 1728, 1727, 1726, 1725, 1724, 1723, 1722 and 1721. Signals received by SGW 1730 over S1U interface 1760 are processed by Layer 1 protocol 1731, Layer 2 protocol 1732, UDP/IP 1733 and GTP-U 1734. In the reverse direction data packets associated with GTP-U 1734 are processed by SGW protocol stack components 1733, 1732 and 1731 in order to generate signals for transmission to eNB 1720 over S1U interface 1760. A further extension of the data path (not shown) may involve onward communication of related data to another core network node such as PGW 325 via an S5/S8 interface and may involve further processing via S5/8 protocol stack components in SGW 1730.

PDCP protocols 1713 and 1724 may include header and/or data compression functionality, and may include data packet sequence numbering to enable lossless handling of user data during handovers of a UE-to-network communication from one eNB to another, or from one SGW to another. RLC protocols 1714 and 1723 may be used to provide data transfer reliability over Uu interface 1750. The RLC protocols may include data packet sequence numbering and acknowledgement or status reporting procedures in order to control and enable retransmissions of erroneously-communicated RLC data packets over the Uu interface. MAC and PHY protocols 1715, 1722, 1716 and 1721 may provide for further control of a faster retransmission scheme such as a Hybrid Automatic Repeat Request (HARQ) retransmission scheme.

Figure 4:
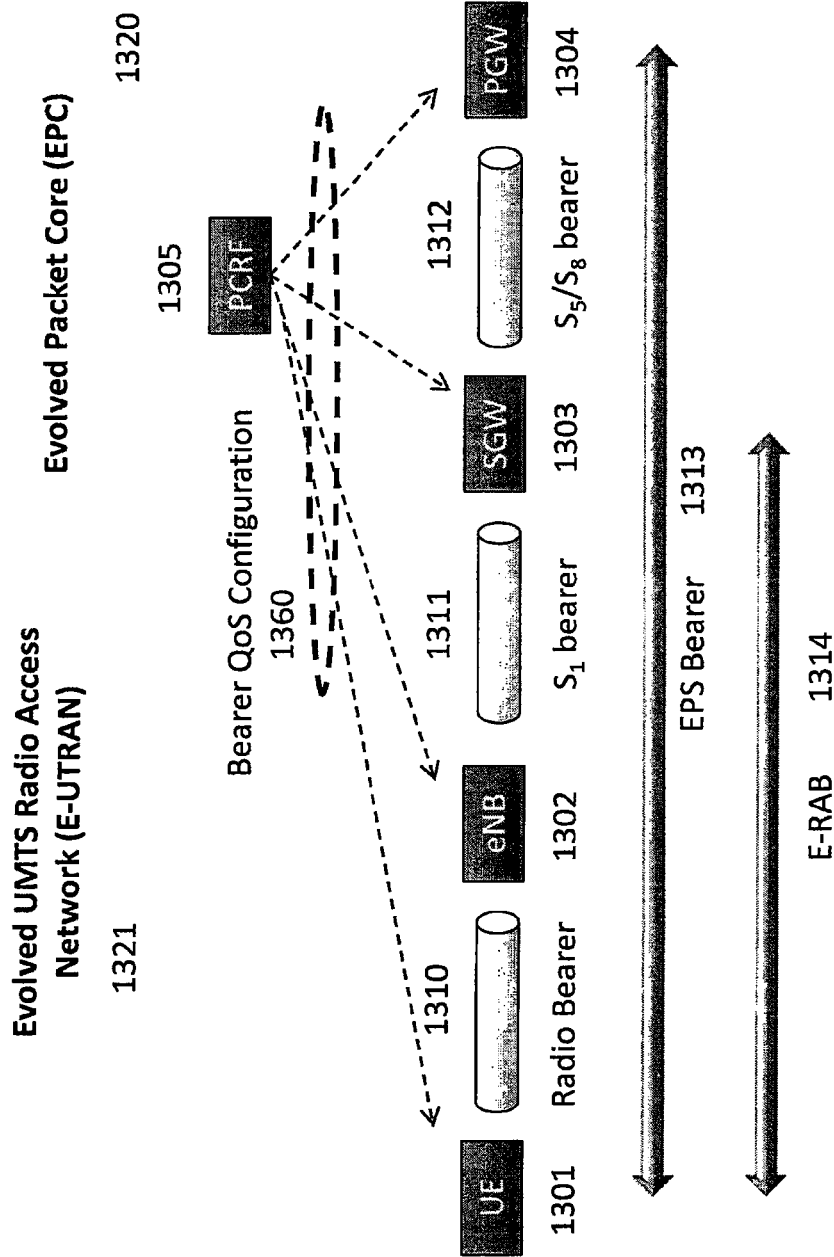
FIG. 4 shows a construction of an Evolved Packet System (EPS) bearer.

FIG. 4 shows a construction of an Evolved Packet System (EPS) bearer 1313 for communications between a UE 1301 and a Packet Gateway Node (PGW) 1304 within an Evolved Packet Core (EPC) network 1320. The Evolved Packet System comprises the EPC 1320 and an Evolved UMTS Radio Access Network (E-UTRAN) 1321. Under the logical architecture of the Evolved Packet System, each data packet of a plurality of data packets communicated over an EPS bearer such as EPS bearer 1313 is intended to be subject to the same data handling characteristics as each other data packet communicated over the same EPS bearer. Data handling characteristics of the EPS bearer may include for example a latency requirement, a guaranteed bit rate (GBR), or a packet loss tolerance value. A Policy Charging and Rules Function node or entity (PCRF) 1305 within the EPC may be logically coupled to one or more of the UE 1301, the eNodeB 1302, the Serving Gateway (SGW) 1303 and the PGW 1304. The PCRF may configure one or more of the nodes along the communication path between the UE 1301 and the PGW 1304, such that the handling of data packets communicated on the EPS bearer is in accordance with a desired data handling characteristic such as a latency requirement, a GBR requirement or a packet loss tolerance value. The desired data handling characteristics may be related to an overall Quality of Service (QoS) requirement, a Grade of Service (GoS) requirement or a Service Level Agreement (SLA). The configuration of the desired data handling characteristics is achieved via a transfer of one or more types of bearer QoS configuration data 1360 from PCRF 1305 to the aforementioned nodes or entities within the wireless communications system. The bearer QoS configuration data 1360 may be delivered via direct interfaces between the PCRF 1305 and the destination node, or via indirect interfaces, passing via one or more intermediate nodes before arriving at the destination node. In the indirect case, an intermediate node may terminate the PCRF control data and may take subsequent actions to appropriately configure other nodes. For example, the PCRF 1305 may provide a SGW 1303 with bearer QoS configuration data and the SGW 1303 may subsequently establish an S1 bearer 1311 with eNodeB 1302. The PCRF 1303 may inform eNodeB 1302 of QoS-related requirements for S1 bearer 1311 and may inform the UE of QoS related requirements of the EPS Bearer (1313). In some cases the PCRF may inform the eNodeB and/or UE 1301 via an intermediate network element such as an Mobility Management Entity (MME). A label termed a QoS Class Index (QCI) may be associated with a plurality of values for a respective plurality of QoS-related parameters, and the QCI may be used as an efficient method of configuring nodes involved in the handling of an EPS bearer with knowledge of its QoS requirements. The QCI may be provided to the P-GW 1304, SGW 1303, eNodeB, 1302 and UE S-GW 1301. For example, a QCI label may be associated with a data transfer latency requirement of 20 ms, a GBR requirement of 64 kbps and a packet loss tolerance of $1 \times 10^{-6}$. Other QCI labels may be associated with different sets of values for the QoS-related handling characteristics associated with an EPS bearer.

More than one EPS bearer may be configured for a particular UE. For example, two different applications running on the same UE may require different QoS and may therefore be communicated over two separate EPS bearers, each separate EPS bearer being configured with different QoS-related parameters via the use of two different QCI labels. In general, multiple parallel EPS bearers may be configured for a UE.

FIG. 4 also shows how each EPS bearer, such as EPS bearer 1313 is comprised of a concatenation of a radio bearer 1310 between UE 1301 and eNodeB 1302, an S1 bearer 1311 between eNodeB 1302 and SGW 1303, and an S5/S8 bearer 1312 between SGW 1303 and PGW 1304. A concatenation of a radio bearer 1310 and an S1 bearer 1311 may be referred to as an E-RAB 1314. A radio bearer, such as radio bearer 1310 is also commonly referred to as a logical channel (LgCH), and the two terms may be used interchangeably.

Applications or services may be identified by means of a set of traffic flow attributes such as source IP address, destination IP address, source port number, destination port number and protocol type, ID or number. Services matching a particular set of traffic flow attributes are mapped or routed onto an EPS bearer (and therefore to a corresponding radio bearer or logical channel) in accordance with rules defined by the PCRF. In the case of downlink, the PGW filters the ingress traffic and maps or routes the associated packets (based on their traffic flow attributes) to the appropriate EPS bearer, under guidance from the PCRF. For uplink traffic flows, packets emanating from applications or services are mapped or routed towards EPS bearers (and hence onto radio bearers or logical channels) again according to their traffic flow attributes under control of the PCRF. The routing is achieved via the use of so-called Traffic Flow Templates or TFT's that are configured in the UE via signalling between the EPC network and the UE.

Figure 5:
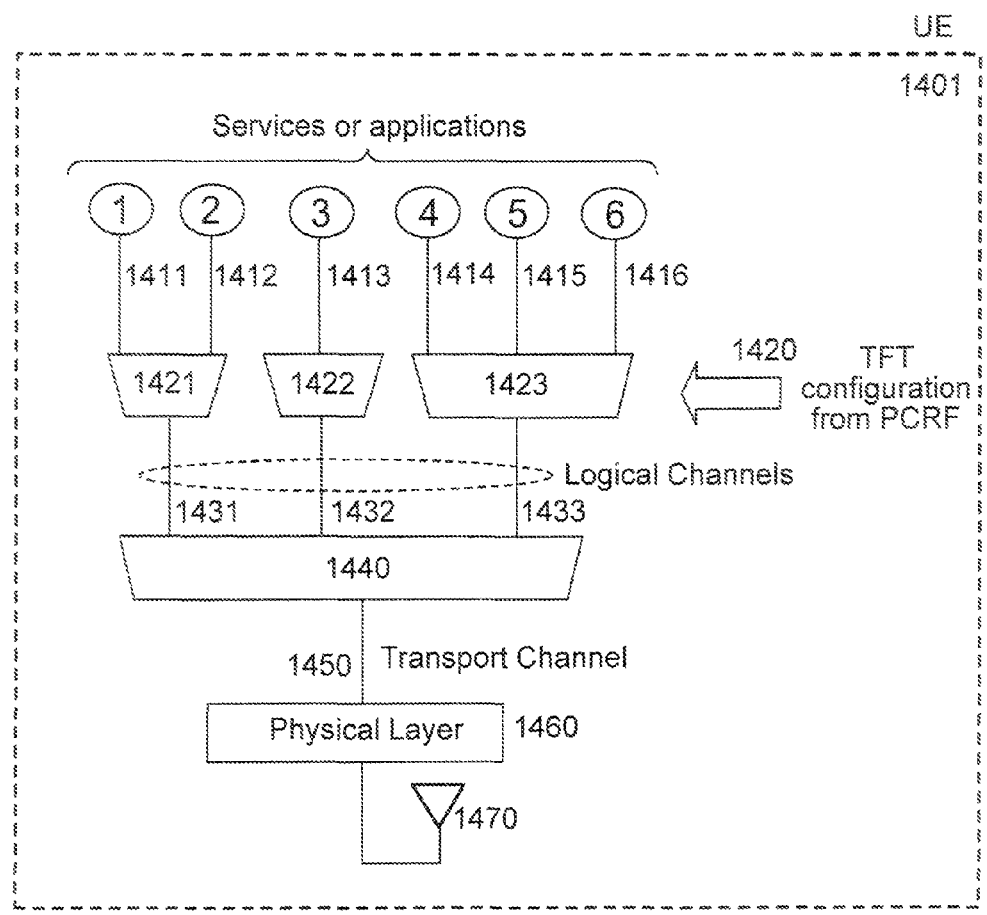
FIG. 5 shows an example UE architecture for mapping traffic flows to EPS bearers.

FIG. 5 shows an example UE architecture for mapping traffic flows (e.g. corresponding to services or applications) to EPS bearers. Each EPS bearer has a one-to-one association with a radio bearer or logical channel. In the example, a UE 1401 comprises a plurality of traffic flows, 1411, 1412, 1413, 1414, 1415, 1416. Each traffic flow is identified by one or more of its traffic flow attributes such as may comprise source IP address, destination IP address, source port number, destination port number and protocol type, ID or number. Traffic flows may also be referred to as Service Data Flows (SDFs). UE 1401 may include traffic flow multiplexers such as multiplexers 1421, 1422, and 1423. The traffic flow multiplexers are arranged in order to multiplex traffic flows onto a possible plurality of logical channels such as logical channels 1431, 1432 and 1433. The arrangement of the multiplexers and to which traffic flows they are connected is performed in accordance with TFT configuration information received from the PCRF, such as PCRF 1305. Each logical channel, such as logical channels 1431, 1432 and 1433 may be associated with a QCI label identifying a possible plurality of QoS-related parameters pertaining to that logical channel. The possible plurality of QoS-related parameters may be associated with the QCI label by means of a pre-defined or pre-configured table, or other associative means. In the example, logical channels 1431, 1432 and 1433 are multiplexed using multiplexer 1440 onto a single transport channel 1450 although it may be possible for a plurality of logical channels to be multiplexed via one or more multiplexers onto a further plurality of transport channels. Transport channels are multiplexed to form signals for transmission on radio resources via physical layer processing block 1460. The signals are transmitted by the UE 1401 via one or more antennas such as antenna 1470.

Figure 6:
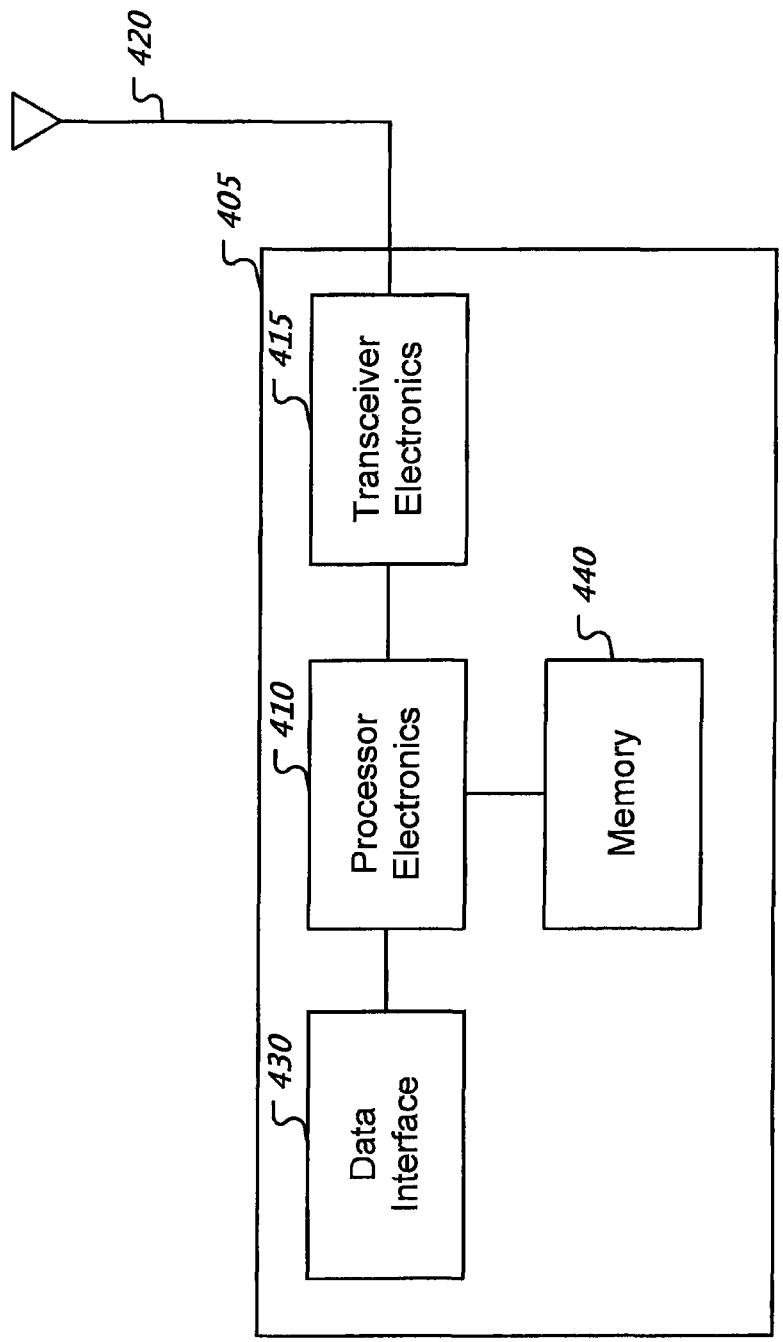
FIG. 6 shows an example of a radio station architecture.

FIG. 6 shows an example of a radio station architecture for use in a wireless communication system. Various examples of radio stations include base stations and wireless devices. A radio station 405 such as a base station or a wireless device can include processor electronics 410 such as a processor that implements one or more of the techniques presented in this document. A radio station 405 can include transceiver electronics 415 to send and receive wireless signals over one or more communication interfaces such as one or more antennas 420. A radio station 405 can include other communication interfaces for transmitting and receiving data. In some implementations, a radio station 405 can include one or more wired network interfaces to communicate with a wired network. In other implementations, a radio station 405 can include one or more data interfaces 430 for input/output (I/O) of user data (e.g., text input from a keyboard, graphical output to a display, touchscreen input, vibrator, accelerometer, test port, or debug port). A radio station 405 can include one or more memories 440 configured to store information such as data and/or instructions. In still other implementations, processor electronics 410 can include at least a portion of transceiver electronics 415.

A wireless device can transition between connection states, such as RRC connection modes. In the LTE system, two RRC connection modes exist, RRC connected and RRC idle. In an RRC connected mode, radio and radio access bearers (e.g., the Uu and S1 bearers) are established to enable the transfer of user plane data through a radio access network and onwards to the core network. In the RRC idle mode, radio bearers and radio access bearers are not established and user-plane data is not transferred. In some implementations, a limited degree of control signaling is possible in idle mode to enable the wireless network to track the location of the device should a need for communications arise.

A wireless device, in a RRC-connected state, can use a DRX operational mode to conserve power by turning-off transceiver functionality, e.g., turning-off transceiver circuitry such as receiver circuitry. In some implementations, a wireless device ceases to monitor a wireless channel and, accordingly, ceases to operate a digital signal processor to decode wireless signals while in the DRX operational mode.

Figure 7:
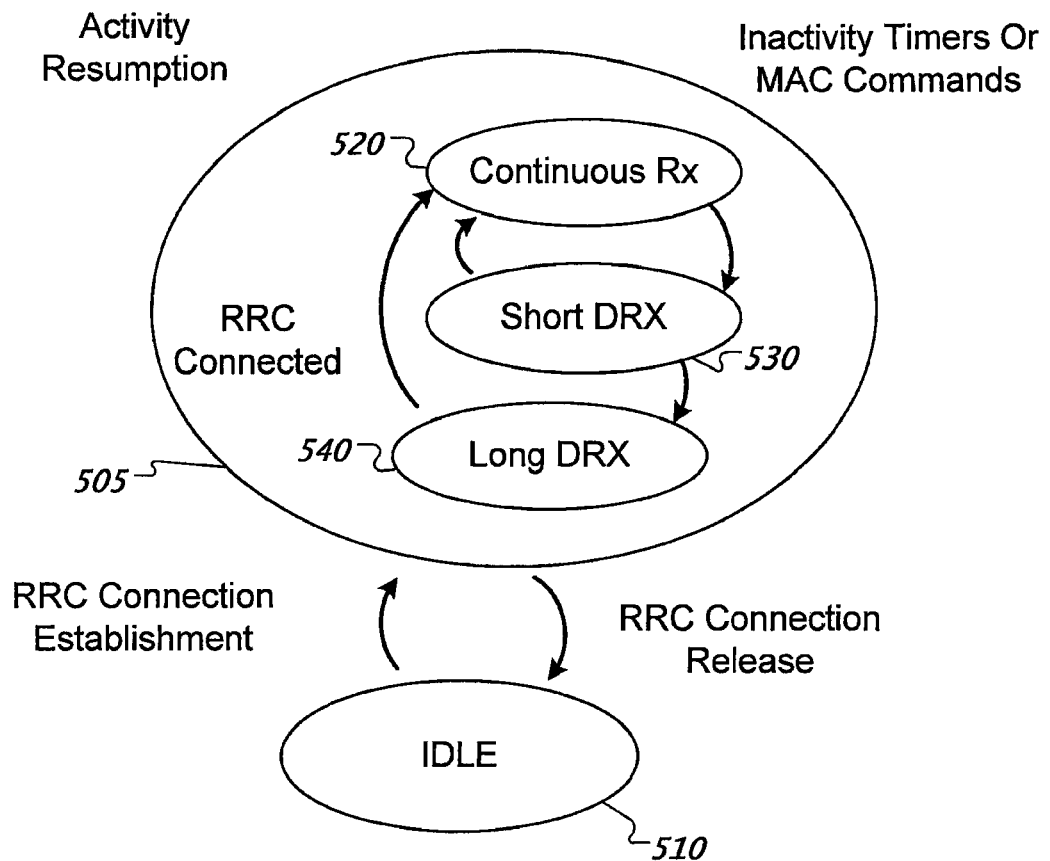
FIG. 7 shows an example of a transition diagram for Radio Resource Control (RRC) and discontinuous reception.

FIG. 7 shows an example of a transition diagram for RRC and DRX. RRC connection states include a RRC connected state 505 and an idle state 510. Transitions between the idle state 510 and the connected state 505 are effected via RRC establishment and release procedures. Such transitions can produce associated signaling traffic between a wireless device and a base station.

UE DRX functionality may comprise a mechanism to control when the UE monitors a wireless grant channel such as the downlink Physical Common Control Channel (PDCCH) in LTE by application of discontinuous reception. The specific times during which the UE may be active and capable of reception may be described by a time-domain pattern known as a DRX cycle. The time domain pattern may vary or may be reconfigured as a function of a data activity level. Such a variation or reconfiguration may further be triggered or controlled by timers. For a particular communication between a network and a UE, a plurality of possible DRX cycle configurations may exist and one of the plurality may be selected in accordance with a desired system operation for the communication. In such a case, the system may include a plurality of DRX sub-states and a controller configured to select an appropriate DRX sub-state from the plurality of DRX sub-states based, at least in part, on a desired system operation. Parameters or timers controlling or defining the DRX cycle may be associated with each of the plurality of DRX sub-states according to system configuration. In some implementations, DRX sub-states per-se may not be explicitly implemented and in such a case the term "DRX sub-state" may refer only to a particular configuration of parameters or condition of one or more timers (e.g., running or not running). The term "DRX sub-state" may therefore be used interchangeably with "DRX status" of DRX-related parameters or timers, hence a configured plurality of DRX-related parameters may be referred to as a DRX sub-state.

The RRC connected mode state 505 may be associated with a plurality of DRX sub-states (or DRX status). The DRX sub-states (or DRX status) include a continuous reception (continuous-rx) state 520, a short DRX state 530, and a long DRX state 540. In the continuous reception state 520, a device may be continuously monitoring all or almost all downlink sub-frames for wireless traffic and can transmit data. In the short DRX state 530, the device can be controlled to turn off its receiver (e.g., sleep, or DRX) for all but Q out of N sub-frames. In the long DRX state 540, the device can be controlled to turn off its receiver (e.g., sleep, or DRX) for all but Q out of M sub-frames, where M is typically greater than N. In one example, Q equals 1, N equals 8 and M equals 256. In a LTE-based system, a sub-frame is a 1 millisecond unit of transmission time.

In some implementations, an expiration of an inactivity timer causes a state transition (e.g., continuous reception state 520 to short DRX state 530 or short DRX state 530 to long DRX state 540). Resumption of activity such as the device having data to transmit or receive new data can cause a transition from a DRX state 530, 540 to the continuous reception state 520. In some implementations, a base station sends a MAC command that causes a transition from the continuous reception state 520 to one of the DRX states 530, 540. In other words, MAC commands may also be used by the network (sent from eNB to the UE) in order to explicitly direct a transition to an increased DRX sub-state. A resumption of data activity typically results in a transition to the continuous reception sub-state. Transitions between Idle and Connected Mode may be effected using explicit RRC establishment and release signaling procedures, which involves associated signaling overheads. The base station's decision to send a MAC command to cause the UE to transition to another DRX may be based on timers within the network, or may be based on a plurality of other factors or events. In one improved method, the base station may send the MAC command in response to a fast dormancy request received from the UE, the fast dormancy request indicating the UE's desire to be transitioned to a more battery-efficient state, the more battery-efficient state comprising a new DRX sub-state or new DRX status. The UE may transmit a fast dormancy request (e.g., explicit message, indication message) to the network based on a determination that no more data transfer is likely for a prolonged period. For example, the UE may transmit the explicit message (e.g., an indication message) requesting an updated sub-state to a more battery efficient sub-state and the request to release resources. In some implementations, the signaling command may be a Signaling Connection Release Indication (SCRI) message. The UE's step of determining may involve an appraisal of currently-operational applications or processes running on the mobile device, and/or the status of acknowledged mode protocols or acknowledged mode transfer of data. For example, if the UE is aware that a particular data transfer has ended due to its reception of an acknowledgement message, the UE may decide to send a fast dormancy request to the network. The network may respond with a message to the UE to indicate that it should move to a new DRX sub-state or to otherwise alter its DRX status. This message may be sent within a MAC CE command or may be sent within a physical layer message such as on a PDCCH. In the improved method, receipt of the message at the UE not only triggers a transition to a new DRX sub-state or a change in DRX status, but may also trigger a release of assigned uplink control resources. Thus, by use of this improved method, the network does not need to send a further message specifically for the purposes of releasing the uplink resources, and signaling overheads are thereby reduced.

In each of these DRX sub-states, both the UE and network can, in some implementations, be synchronized in terms of the currently-applicable DRX status or DRX sub-state such that both the network and UE identify when the UE receiver is active and when the UE receiver may be "off", "asleep" or otherwise inactive. In an explicit synchronization method, the synchronization between UE and eNB in terms of the used DRX sub-states is achieved via commands sent from the eNB to the UE controlling the current DRX sub-state in use. In an implicit control method, the eNB may configure DRX-related parameters or timers in the UE, and both the eNB and UE may execute rules (triggered by defined events) and/or run timers in order to determine a time at which a DRX sub-state transition may occur. To remain synchronized, both the UE and the eNB execute the same rules and the same event triggers in order that they derive the same DRX sub-state transition times as one another without the need for explicit signaling messages as per the explicit synchronization method. Within the connected mode, an implicit synchronization method may be achieved using network-configured timers and/or parameters and/or triggering rules. Methods involving both explicit and implicit DRX sub-state synchronization methods may also be implemented. For example, in the LTE system, a transition from either of the short or the long DRX sub-states to the continuous-Rx sub-state is implicitly controlled (triggered by the arrival of new data for transmission), whereas transition from the continuous-Rx sub-state to either of the short or long DRX sub-states may be either explicitly controlled (via DRX sub-state transition commands) or implicitly controlled (e.g. triggered by data inactivity). An implicit synchronization method means that both the UE and the eNB effect the same DRX sub-state transition without explicit DRX-related communication with the other.

The LTE system may also provide for DRX battery saving in RRC Idle. When in Idle Mode, the UE may employ a DRX pattern according to a so-called paging cycle. On a possible paging occasion, the UE may activate its receiver to check for a page message sent by the network. At other times, the UE may deactivate its receiver in order to conserve power.

Based on the illustrated transition diagram of FIG. 7, within the LTE system, two different approaches may be employed to control the UE's RRC state as a function of data activity or inactivity. In the first approach, inactive devices may be transitioned to idle mode relatively quickly. A resumption of data activity may invoke execution of RRC connection establishment procedures and may incur signaling overhead. In the second approach, inactive devices may be held for a considerable time (for example, many minutes, even hours) in RRC Connected Mode before a transition to idle is executed.

Figure 8:
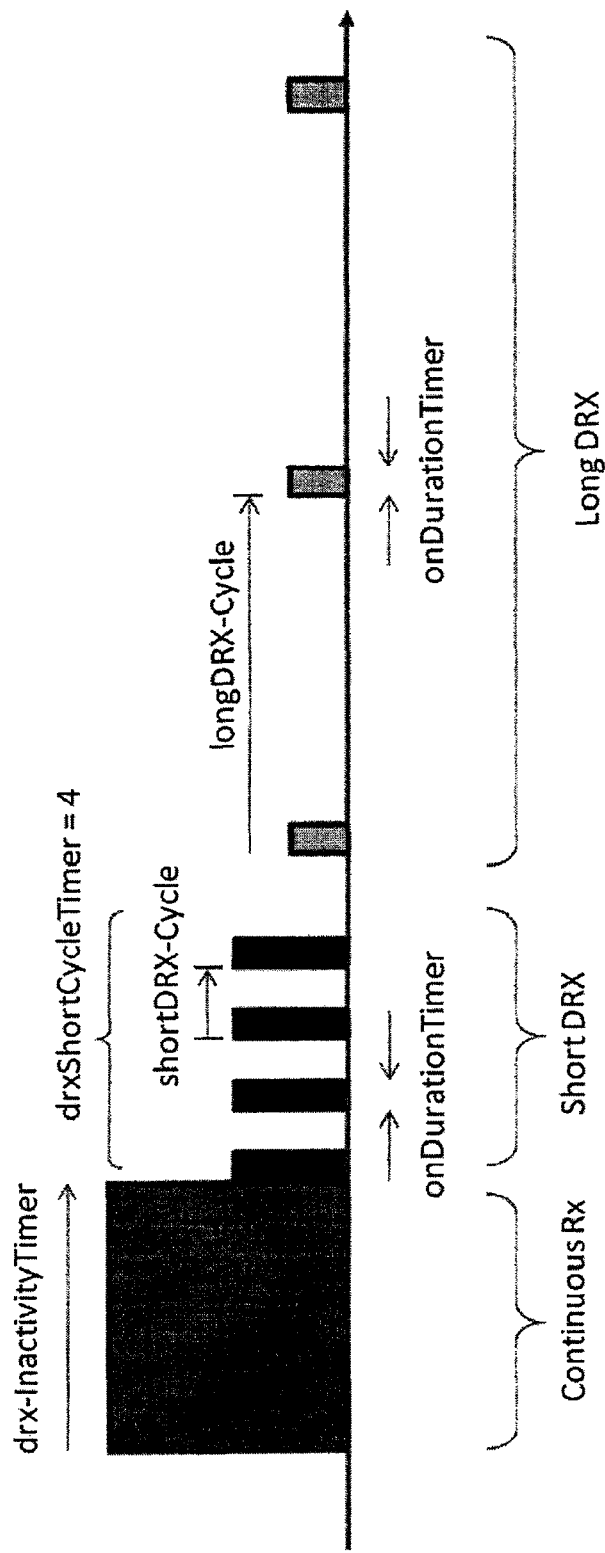
FIG. 8 shows different reception patterns.

FIG. 8 is a schematic diagram 700 illustrating the different DRX reception patterns and associated parameters within the present LTE system. In particular, the diagram 700 includes the Continuous Rx 702, short DRX 704, and Long DRX 706. Within RRC Connected Mode, the DRX reception patterns 702 and 704 (defined at the sub-frame level in the time domain) may be controlled by the network assigning various timers and parameters to the UE. The following parameters, defined in 3GPP technical specification 36.321, may determine the DRX patterns 704 and 706: drx-InactivityTimer 708*a*; shortDRX-Cycle 708*b*; drxShortCycleTimer 708*c*; on DurationTimer 708*d*; longDRX-Cycle 708*e*; drxStartOffset 708*f*; and/or others. The drx-InactivityTimer parameter 708*a* is a number of consecutive PDCCH-subframe(s) after successfully decoding a PDCCH indicating an initial UL or DL user data transmission for this UE and reflects the time the UE remains in continuous-Rx mode after reception of the last new packet (in FIG. 8 only a single data packet is assumed to exist, located at the start of the continuous Rx portion of time). The shortDRX-Cycle 708*b* parameter is the fundamental period of the short DRX pattern/duty-cycle. The drxShortCycleTimer parameter 708*c* is the number of fundamental periods of the short DRX cycle that the UE will remain in short DRX for (if inactivity continues) before transitioning to Long DRX. The on DurationTimer parameter 708*d* is the number of sub-frames for which the UE is "awake" at the start of each DRX cycle fundamental period. The longDRX-Cycle parameter 708*e* is the fundamental period of the long DRX pattern/duty-cycle. The drxStartOffset parameter 708*f* defines the subframe offset for the start of the DRX cycle patterns in short and long DRX. The total length of time that a UE will remain in short DRX when inactive is equal to (shortDRX-Cycle*drxShortCycleTimer) ms. A set of DRX parameters (such as may comprise the on DurationTimer, drx-InactivityTimer, shortDRX-Cycle, drxShortCycleTimer, drxStartOffset, shortDRX-Cycle and longDRX-Cycle) may be configured for a particular UE by the network. This may be accomplished by means of RRC signaling transmitted by the network to the UE. The RRC signaling may comprise one or more RRC messages, the one or more RRC messages further comprising one or more information elements (IEs) that contain the DRX parameter or timer values. Configuration or reconfiguration of the DRX parameters may occur at any time during the RRC connected mode using the RRC signaling method. In a typical network implementation, a set of DRX parameters may be configured in a UE by the network as the result of a transition of the UE from RRC idle to RRC connected. Furthermore, in typical network implementations, a single set of DRX parameters may be configured for the duration of a stay in RRC connected mode (i.e., reconfiguration of DRX parameters during RRC connected is uncommon). Due to the fact that each DRX parameter configuration or reconfiguration requires transmission of RRC signaling messages from the network to the UE (and potentially corresponding protocol acknowledgement messages transmitted from the UE to the network), any frequent reconfiguration of the DRX parameters may incur substantial signaling overheads which may detract from the overall efficiency and capacity of the wireless system. Thus, frequent reconfiguration of DRX parameters is commonly avoided.

The use of a non-continuous reception pattern, such as created by the use of DRX patterns, may result in increased latency due to delaying (or buffering) of transmission of a packet to the UE whilst it is not actively receiving. A trade-off may exist between latency and battery efficiency: continuous reception, high battery consumption, low latency; short DRX, medium battery consumption, medium latency; and long DRX, low battery consumption, high latency.

During times of more-intense data activity, the continuous reception MAC sub-state may be used. During times of reduced data activity, or during times of data inactivity, either the RRC idle state or the RRC connected mode short or long DRX sub-states may be used.

A wireless device manufacturer may try and configure a wireless device, such as a smart phone, to best preserve battery life while also providing a desired level of responsiveness and data packet latency. One difficulty in accomplishing this goal is that smartphone device traffic, comprising a plurality of data packets, is often the aggregate of multiple traffic sources (e.g. applications) within the device. Each traffic source comprises its own plurality of data packets which may differ in terms of packet arrival or packet generation behavior. The packet arrival or packet generation behavior may be referred to as a traffic profile. The statistics of a traffic profile (governed by the packet arrival or packet generation process) may be substantially different for each traffic source. For example, a voice source generates packets with a particular traffic profile that differs from the traffic profile of a web browsing source, which is different again to the traffic profile of an application generating (for example) a periodic tunnel keep-alive packet.

From a statistical perspective, a traffic profile may be partially characterized in terms of its packet inter-arrival time (IAT) distribution. The packet inter-arrival time is defined as the period of elapsed time between each successive packet associated with the traffic source (i.e. a difference between two successive packet "timestamps"). A packet timestamp may be associated with each packet via several means, such as for example the time at which the packet entered a transmission buffer or other associated memory associated with a queue of packets for transmission. Alternatively, the timestamp may be associated with the time of generation of the packet by the traffic source. Whilst both are valid timestamps, they may differ slightly due to any intervening time delays which may exist along the communication path between the traffic source itself and the transmission buffer.

Figure 9:
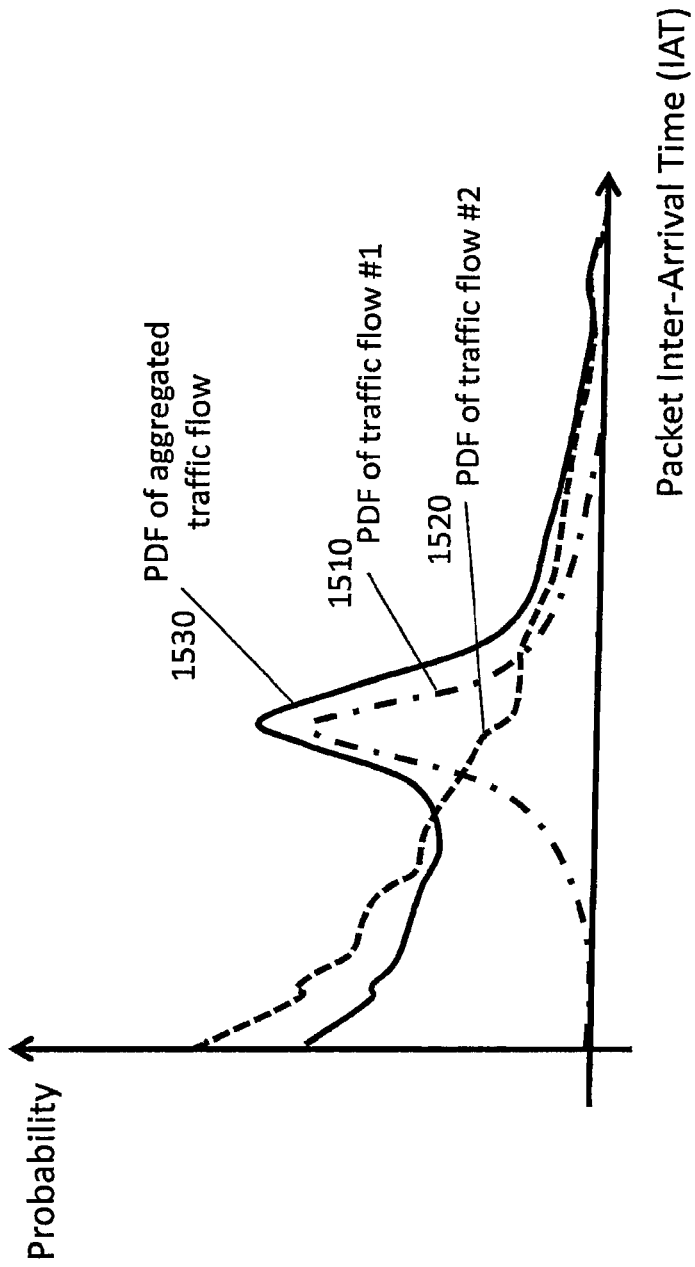
FIG. 9 shows Probability Distribution Functions (PDFs) of data packet Inter Arrival Time (IAT) statistics for first and second traffic flows and an IAT PDF for an aggregated traffic flow comprising data packets from both first and second data flows.

However so derived, differences between successive packet timestamps may be used to characterize a traffic source or aggregation of traffic sources. Specifically, a probability distribution function (PDF) may be associated with a traffic source or aggregation of traffic sources. FIG. 9 shows three IAT PDFs. The horizontal axis represents elapsed time between two successively-generated packets from within a plurality of packets associated with a traffic flow and the vertical axis represents the probability of any two successively-generated packets being separated by this amount of elapsed time. The integral of each IAT PDF over all possible inter-arrival times is equal to one. A first IAT PDF 1510 provides statistical information pertaining to a first traffic flow, whilst a second IAT PDF 1520 provides statistical information pertaining to a second traffic flow. In the event that packets from the two traffic flows are multiplexed into an aggregated traffic flow, packets of the aggregated traffic flow will exhibit different statistics in terms of packet inter-arrival time to those of either of the contributing traffic flows. Thus, the aggregated traffic flow will exhibit a different IAT PDF, such as IAT PDF 1530. The exact shape of an IAT PDF for an aggregated traffic flow will depend at least on the statistical correlation between the plurality of contributory traffic flows and on the relative number of packets arriving from each traffic flow.

Whilst an overall traffic profile associated with a communication between a network and a UE is potentially an aggregate of a plurality of contributory traffic sources, it cannot be said that a long-term averaged statistic of the overall traffic profile is representative of the actual traffic at any one time as this depends on which applications are active at that time. The consequence of this is that any particular time, a configured set of discontinuous reception (DRX) parameters (such as, amongst others, the drx-InactivityTimer) may not actually strike the right (or intended) balance between latency and power saving. Thus, latency is either "too-good" at the expense of poor battery efficiency, or unacceptably poor with overly aggressive power efficiency saving. As aforementioned, any reconfiguration of the DRX parameters incurs significant RRC signaling overheads, therefore, for network efficiency reasons, only a single set of DRX parameters may be configured for the duration of the stay in RRC connected mode. This single set of DRX parameters may be sub-optimal and is unable to adapt to shorter-term changes in the aggregated traffic profile associated with the communication between the UE and the network. This represents a disadvantage for the current LTE system.

In order to address the above disadvantage, a wireless device is proposed which may be configured so that one or more DRX configuration parameters are adjusted or selected based upon the most demanding latency/QoS characteristic of any of the traffic sources contributing to the aggregated traffic profile associated with the communication between the UE and the network.

Figure 10:
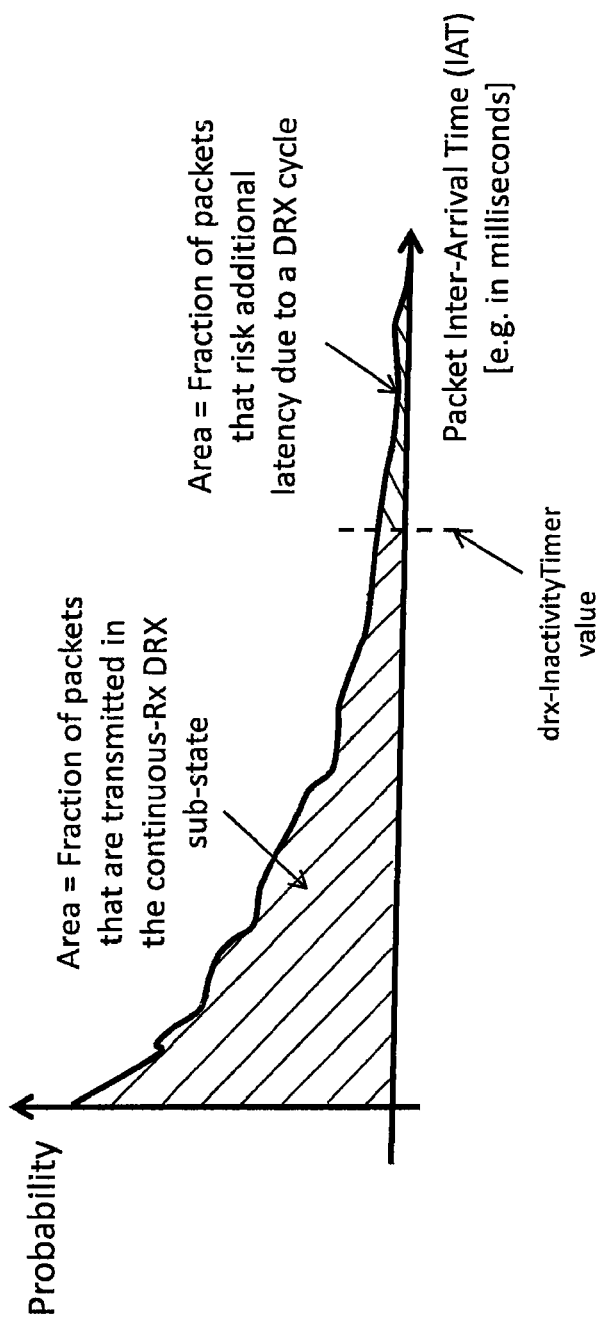
FIG. 10 shows a Probability Distribution Function (PDF) of a data packet Inter Arrival Time (IAT) statistic for a traffic flow comprising a plurality of communicated data packets.

FIG. 10 is a diagram of a packet inter-arrival time probability distribution function (IAT PDF) in relation to a traffic source (such as may reside in a UE or other mobile device attached to the UE), the traffic source comprising a plurality of generated packets. The horizontal axis represents elapsed time between two successively-generated packets from within the plurality of packets and the vertical axis represents the probability of any two successively-generated packets being separated by this amount of elapsed time. The integral of the IAT PDF over all possible inter-arrival times is equal to one.

Recalling the operation of the DRX sub-states, transmission or reception of a first new data packet when in either short or long DRX causes an immediate return to the continuous-Rx sub-state and the drx-InactivityTimer is restarted. The continuous-Rx sub-state prevails until the drx-Inactivity timer expires. Thus, if a second new data packet is transmitted or received before a time equal to the configured expiration time of the drx-InactivityTimer has elapsed since the first new data packet, the second new data packet will not suffer any additional transmission latency caused by a DRX cycle due to the fact that all or almost all sub-frames are available for transmission or reception. On the other hand, if the second new data packet is transmitted or received after a time equal to the configured expiration time of the drx-InactivityTimer has elapsed since the first new data packet indication, the second new data packet may suffer additional transmission latency caused by a DRX cycle due to the fact that some sub-frames are not available for reception of the second data packet. Thus, for a particular traffic profile with a particular IAT PDF, an adjustment of the drx-InactivityTimer setting affects the ratio of all data packets that are communicated without additional latency (i.e. those communicated whilst the continuous-Rx sub-state is active) to those that risk being communicated with some additional latency (i.e. those communicated whilst either the short or long DRX sub-states are active).

In one possible network implementation, the network may attempt to determine suitable values for one or more DRX parameters and to configure the UE with these values based on anticipated statistics (such as an IAT PDF) of an aggregated traffic profile for a UE. The anticipated statistics may be learned from long term experience or off-line analysis of common UE traffic profiles. The one or more suitable DRX parameters preferably includes the drx-InactivityTimer parameter, but could also include others such as the on DurationTimer, shortDRX-Cycle, drxShortCycleTimer, shortDRX-Cycle or longDRX-Cycle. For example, the network may configure a value of 100 ms for the drx-InactivityTimer based upon an expected or generic IAT PDF indicating that 5% of all data packets exhibit an IAT of more than 100 ms. In this example, 5% of all data packets being subjected to a risk of increased transmission latency due to a DRX cycle is considered as a design target, or tolerable value, and when used in conjunction with the IAT PDF, may be used to assist in determining an appropriate value for the drx-InactivityTimer. In one configuration, the same value is set for the drx-InactivityTimer (or the same values for one or more other DRX-related parameters) for all UEs. Such an approach represents a non-adaptive setting of one or more of the DRX-related parameters such as the drx-InactivityTimer.

Referring again to FIG. 12, and assuming that a communication with a UE comprises a series of data packets in an aggregated traffic profile with statistics similar to those in the IAT PDF shown, an adjustment of the drx-InactivityTimer value to a larger positive value results in a smaller percentage of packets that are communicated in either the short or long DRX sub-states, and hence a smaller percentage of packets that risk additional transmission latency due to the use of a DRX pattern. By increasing the configured value for the drx-InactivityTimer, the proportion of packets communicated in the continuous-Rx sub-state is increased. Conversely, an adjustment of the drx-InactivityTimer to a smaller positive value results in a larger percentage of data packets that are communicated in either the short or long DRX sub-states, and hence a larger percentage of packets that risk additional transmission latency due to the use of a DRX pattern. By decreasing the configured value for the drx-InactivityTimer, the proportion of packets communicated in the continuous-Rx sub-state is decreased.

In an improved or more advanced network implementation, the network may actively monitor the statistics of an ongoing communication with the UE and may adapt or adjust the configured value of a drx-InactivityTimer (or one or more other DRX-related parameters) based on an ongoing analysis by the network of the statistics of the aggregated traffic profile or communication with the UE. Thereby, the network may attempt to optimize the drx-InactivityTimer parameter or one or more other DRX-related parameters according to a currently-observed traffic profile, or an observed statistic of a current traffic flow or aggregated traffic flow. The optimization may include an optimization of UE battery consumption whilst maintaining certain latency or Quality of Service criteria associated with the communication with the UE, such as QoS parameter values associated with one or more QCI labels. The adjustment or adaptation of the one or more DRX-related parameter values may be triggered based upon a determined data activity of a communication between a UE and a network, or may be triggered based upon observed desirable or undesirable data packet latency events or other triggering events associated with data packets or protocols related to a communication between a UE and the network.

The step of adapting or adjusting the drx-InactivityTimer or the one or more DRX-related parameters may include explicit signaling messages such as those transmitted from the network to the UE via RRC signaling, via MAC signaling such as a Medium Access Control Control Element (MAC CE) contained in a MAC Packet Data Unit (PDU), or via a physical layer message such as may be carried on a PDCCH. The signaling messages may contain one or more parameter reconfiguration values, or may contain positive or negative adjustment amounts to one or more parameter values. For example, if a DRX-related parameter has a first value of 20, the signaling messages may contain a new absolute value of 15, or may contain an adjustment value of −5. In an alternative implementation the signaling may be indicative of a predetermined, or signaled delta or step adjustment, e.g. where the step or delta has been predetermined or signaled to be 5 then an indicative adjustment of −1 would correspond to an actual adjustment of −5. On application of the reconfigured DRX parameter values (or adjustments to thereof) by the UE and by the network, an adjustment in the DRX patterns, DRX cycles or DRX behavior may be achieved for the communication with the UE.

Whilst the method of using explicit signaling between the network and the UE does allow for a continued optimization of DRX-related parameters according to an observed traffic profile, this method also entails additional signaling overheads which may reduce the efficiency or capacity of the wireless communications system. In a yet further improved system and method, signaling overheads associated with each reconfiguration of a DRX-related parameter are avoided by means of linking a plurality of possible values for the DRX-related parameter to a corresponding plurality of communication conditions. A communication condition may comprise a condition of activity of one or more radio bearers or logical channels associated with the communication between the network and the UE.

Both the UE and network need to be synchronised in terms of their mutual understanding of the current DRX pattern in use. As shown in FIG. 8, the DRX pattern may be controlled by one or more DRX-related parameters, such as drx-InactivityTimer 708*a*; shortDRX-Cycle 708*b*; drxShortCycleTimer 708*c*; on DurationTimer 708*d*; longDRX-Cycle 708*e*; drxStartOffset 708*f*; and/or others. Thus, there is a need for DRX parameter synchronisation between the UE and the eNB. It should be noted that DRX parameter synchronisation may be an independent process to that of DRX sub-state synchronisation. A set of DRX parameters may apply to all DRX sub-states. A change in the DRX parameters may affect or define behaviour for a plurality or all DRX sub-states. A change in DRX sub-state may occur without any change to the DRX parameters. DRX parameter synchronisation may be achieved via an explicit method (involving the sending of DRX parameter reconfigurations from the eNB to the UE) or may be achieved via an implicit (i.e., automatic or autonomous) method (obviating the need for explicit reconfiguration signalling on each DRX parameter reconfiguration). Preferably, DRX parameter synchronisation should be achieved with the minimum of signalling overhead, leading towards the use of the implicit method. An implicit method means that the method is carried out by either the UE, eNB, or both, without explicit communication with the other. Explicit reconfiguration of DRX parameters is possible via RRC signalling in the current LTE system, however, regular changes in these parameters would lead to a significant signalling overhead. Thus, in the proposed solution, and in support of an implicit means of DRX parameter synchronisation, it is preferred that defined rules are specified or configured governing a relationship between triggering events and the DRX parameters or parameter sets in use. Specifically, DRX parameter reconfiguration using an implicit synchronisation method is proposed in order to adapt, adjust or otherwise modify one or more DRX parameters in accordance with a packet activity characteristic of one or more logical channels. Such an adaptation may be performed in order to continually-optimise a trade-off between UE battery efficiency and data packet latency as logical channel activity is varied.

The packet activity characteristic of the one or more logical channels may be derived for example from an observed data activity on the one or more logical channels. Observed data activity of a logical channel may be defined via rules in a number of ways, but by means of example may take the form of a data activity status or flag for that logical channel. In a first rule, the data activity status or flag for a logical channel may be set based on the passing (transmission alone, reception alone, or transmission or reception) of any new packet over the logical channel within the last X seconds, where X is any predetermined or desired value. Alternatively, in a second rule, the data activity status or flag may be set based on the receipt of a packet acknowledgement or protocol message acknowledgement within the last Y seconds where Y is any predetermined or desired value. The packet acknowledgement may comprise a Hybrid Automatic Repeat Request (HARQ) acknowledgement, the HARQ protocol (such as may be provided by MAC or PHY protocols 1715, 1722, 1716, 1721) controlling retransmissions over a wireless interface. As a further alternative, in a third rule, the data activity status or flag may be set based upon a buffer status report communicated between the UE and the eNB or vice versa. The buffer status report may include, for each logical channel, an indication of the volume of data presently queued or buffered for transmission over the wireless interface between the UE and the eNB. In a forth rule, the data activity status or flag may be set based upon a Radio Link Control (RLC) message such as an RLC status Protocol Data Unit (PDU) indicating the transmission status of queued data packets for one or more logical channels. An RLC protocol (such as RLC protocol 1714, 1723) may be used to control retransmissions over a wireless interface. In a fifth rule, the data activity status or flags may be set based upon a Packet Data Convergence Protocol (PDCP) layer (such as PDCP 1713, 1724).

The packet acknowledgement, protocol message acknowledgement, buffer status report, RLC status PDU or PDCP protocol message used to form a data activity status or flag may be transmitted by an eNB and received by a UE, or may be transmitted by a UE and received by an eNB. The data activity status or flag may be set within an UE such as UE 305 or within an eNB such as eNB 310*a*. In order to facilitate an implicit DRX parameter synchronization method, data activity status or flags for each logical channel are preferably maintained at both the UE and the eNB. Preferably, the times at which the data activity status or flags are set (indicating activity) and cleared (indicating inactivity) for a particular logical channel are well aligned between the UE and the eNB. That is, for a particular logical channel used for communication between a UE and an eNB, the UE may maintain a first data activity status or flag and the eNB may maintain a second data activity status or flag. The times at which the first and second data activity status or flags transition from active to inactive, or from inactive to active, are preferably well aligned such that both the UE and the eNB have a common understanding of the current logical channel activity status.

The rule or rules used within a UE to determine the data activity status or flags for each logical channel may be controlled via signaling sent by an eNB to the UE. The signaling may be signaled on common or broadcast signaling channels transmitted by an eNB to all UEs in a cell (one to many signaling) or on dedicated signaling channels transmitted by an eNB to a specific UE (one to one signaling). The signaling may be carried at various protocol layers, such as at an RRC protocol layer, a medium access control (MAC) layer, or a physical layer.

The status of one or more logical channel data activity status or flags may be used to select one or a plurality of DRX-related configuration parameters according to a predefined or preconfigured relationship either individually per logical channel or based on the combined joint status of one or more logical channel data activity status or flags and the up to a plurality of DRX-related configuration parameters. In the case where more than one logical channel is configured the selected predefined or preconfigured relationship for the combined joint status may reflect the most stringent performance value (e.g., most stringent quality of service (QoS) or latency requirement) required of any individual logical channel's predefined or preconfigured relationship. That is, for a DRX-related parameter (such as a drx-InactivityTimer), the network may assign a first particular value to a first logical channel, a second particular value to a second logical channel and a third particular value to a third logical channel. At any instant in time, a single value for the DRX-related parameter may be selected and applied to affect or control a reception pattern (such as a DRX pattern), wherein the selected and applied value is selected according to a maximum or minimum of those DRX-related parameter values assigned to a determined set of logical channels that are determined to have an active logical channel status. For example, where the most stringent performance value reflects the lowest performance value of the DRX-related configuration parameter (e.g., where the DRX-related configuration parameter is the drx-InactivtyTimer) then the longest single value for any single logical channel drx-InactivityTimer is selected from all of the individual logical channel drx-InactivityTimer values either explicitly signaled, predetermined or with a preconfigured relationship. Alternatively where the associated DRX-related configuration parameter is one or more parameters then the most stringent performance requirement of each parameter could be combined and used to form single applicable DRX-related parameter configuration or configurations for the UE to use (e.g., if the DRX-related configuration parameter is on DurationTimer then the longest individual logical channel associated configured parameter could be selected), or in the case of the shortDRX-Cycle the shortest cycle could be selected (or alternatively the longest shortDRX-Cycle could also be selected in an alternative embodiment).

Figure 11:
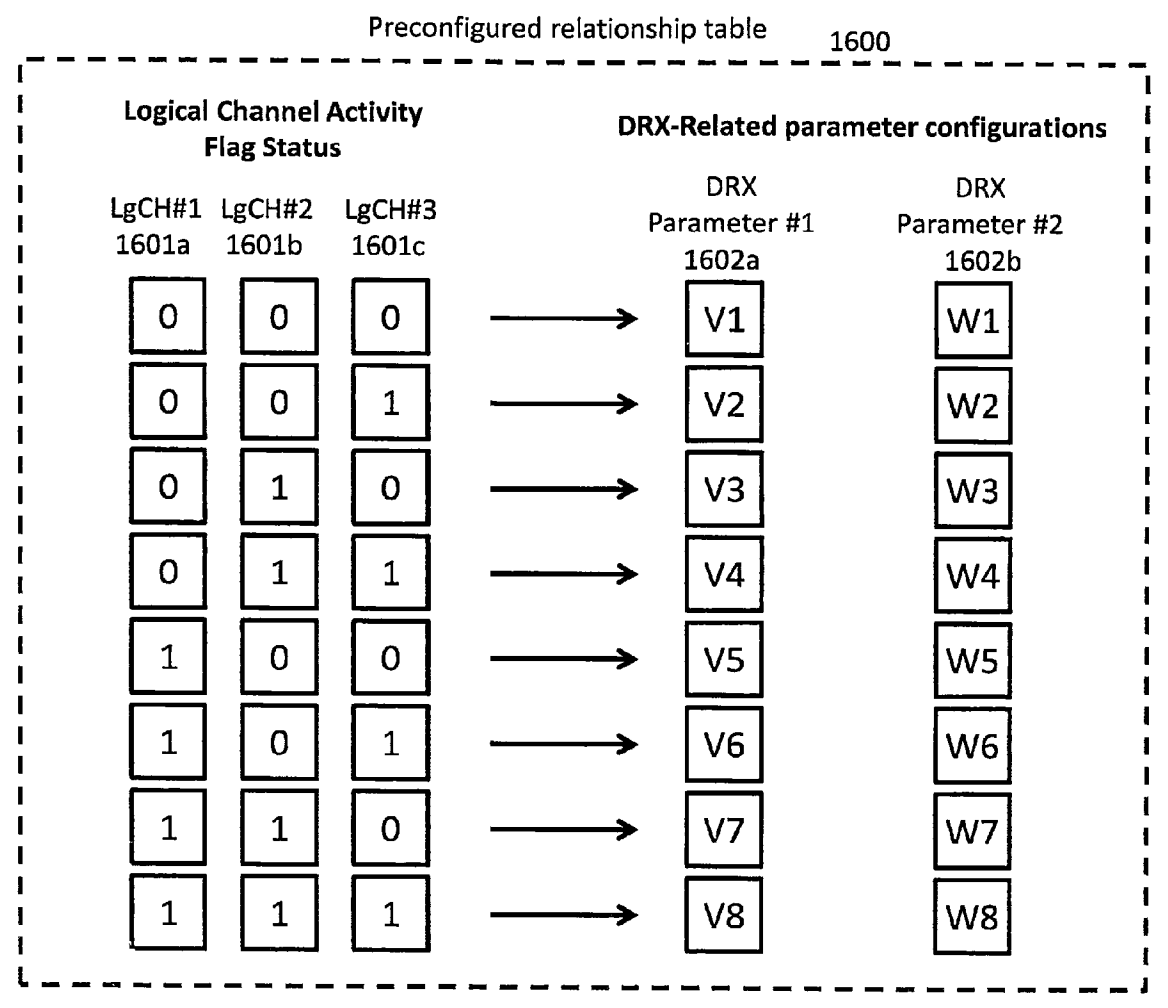

FIG. 11 shows a schematic representation of a preconfigured relationship table 1600 describing a relationship between the joint status of one or more logical channel data activity status or flags and one or more DRX-related configuration parameters. In the example shown, three logical channels (such as logical channels 1431, 1432 and 1433) are assumed to have been configured and which are all related to a communication between a UE and an eNB. Data packets requiring different QoS handling (such as a latency characteristic or requirement) may be mapped onto the different logical channels. A QCI label may be associated with each logical channel. A data activity flag representing an activity status (such as flags 1601a, 1601b and 1601c respectively) is associated with each logical channel. In the shown example, the activity status or flags may adopt binary values or zero or one, but in a more generic sense, need not be restricted to a binary alphabet. The joint status of the data activity flags across the three configured logical channels is used as an index to look-up (or otherwise form an association with) one or more DRX-related configuration parameters, such as DRX parameters 1602a and 1602b. Preferably, at least one of the DRX-related parameters is a drxInactivityTimer, such as drxInactivityTimer 708a. DRX parameter 1602a may adopt values as are denoted by values V1, V2, . . . V8 whilst DRX parameter 1602b may adopt values as are denoted by values W1, W2, . . . W8. The values in the preconfigured relationship table 1600 may be configured in the UE by the network by means of signaling between a network node such as eNB 310a and the UE such as UE 305. The signaling may be carried at various protocol layers, such as at an RRC protocol layer, a medium access control (MAC) layer, or a physical layer. The signaling may be signaled on common or broadcast signaling channels transmitted by an eNB (one to many signaling) or on dedicated signaling channels transmitted by an eNB (one to one signaling). The signaling may comprise a list of the explicit values within the shown preconfigured relationship table 1600 or may comprise parameters relating to rules, equations or mathematical associations that enable construction of the preconfigured relationship table and derivation of the values contained within it. The rules, equations or mathematical associations may further be based on other parameters such as DRX-related parameters. For example, the plurality of values V1, V2, . . . V8 may be constructed from a base value of a drx-InactivityTimer multiplied by one of a respective plurality of multiplication factors. Such an approach may allow for a reduction in the amount of signaling information that must be communicated in order to enable construction of the preconfigured relationship table 1600 in a UE. The preconfigured relationship table may also be stored within an eNB. The eNB and/or the UE may determine the values to include within the table based upon QCI labels or up to a plurality of QoS-related parameters associated with each of the logical channels, such as logical channels 1601a, 1601b and 1601c. The QCI labels or up to a plurality of QoS-related parameters for each of the logical channels may have been communicated to the eNB by a node within an EPC network such as SGW 320, MME 315, PGW 325 or PCRF 1305.

Thus, in some implementations, the eNB and UE both monitor the activity of configured logical channels and both the UE and the eNB analyze this activity and classify (via use of the same, similar or associated rules) each logical channel as either "active" or "inactive". To do so may involve the use of timers or time-domain filters governing the period of time over which a logical channel has a presence or absence of packet transmission before it is classified as "active" or "inactive" (for example as denoted by the status of data activity flags such as flags 1601a, 1601b or 1601c). At specified time instances, the UE and eNB check the set of the data activity status or flags (one for each configured logical channel), and one or more DRX configuration parameters are selected or adjusted according to the result.

FIG. 12 is a flow chart 1100 of a process by which a DRX behavior for a communications interface on a wireless device may be managed. Generally, the operations described in flow chart 1100 can be performed, for example, using the systems and protocols described in FIGS. 1-12. However, the operations may be performed using other systems and other protocols. For example, although some of the operations are described using a wireless device (e.g., a UE or a handset), the operations also may be performed using a base station (e.g., eNB).

Initially, a preconfigured relationship table is constructed (1100) in a wireless device which enables an association between a joint status of up to a plurality of logical channel status indicators and a set comprising one or more DRX-related parameter values. A wireless device then monitors (1120) a communications interface that includes at least a first application mapped to a first logical channel and a second application mapped to a second logical channel. Monitoring the communications interface may include a reading of the activity of data packets, protocol acknowledgements, buffer status reports or retransmission protocol control messages related to up to a plurality of logical channels or radio bearer connections that exist between the UE and the base station or network. In one configuration, an activity status is set on a logical-channel-by-logical-channel or application-by-application basis. For example, a wireless device may maintain an activity status table with an identifier for each logical channel or application that generated the traffic. The wireless device may associate each application identifier with a first logical channel or a second logical channel, where the first logical channel is associated with a first traffic profile or data packet statistic and the second logical channel is associated with a second traffic profile or data packet statistics.

The wireless device determines (1130), based on monitoring the communications interface, a first activity status for the first logical channel. As set forth in this example, the first logical channel includes latency-sensitive applications. Determining the first state may include reading the activity of data packets, protocol acknowledgements, buffer status reports or retransmission protocol control messages related to the first logical channel and determining if the first logical channel is actively involved in exchanging communications and/or has exchanged communications within a recent window of time. Alternatively, determining the first state may include determining if the applications associated with the first logical channel are actively exchanging communications and/or have exchanged communications within the most recent window of time.

The wireless device determines (1140), based on monitoring the communications interface, a second activity status for the second logical channel. As set forth in this example, the second logical channel includes applications that are not deemed as sensitive to latency. Determining the second state may include reading the activity of data packets, protocol acknowledgements, buffer status reports or retransmission protocol control messages related to the second logical channel and determining if the second logical channel is actively involved in exchanging communications and/or has exchanged communications within a recent window of time. Alternatively, determining the second state may include determining if the applications associated with the second logical channel are actively exchanging communications and/or have exchanged communications within the most recent window of time. In one configuration, associating an application with a first logical channel or a second logical channel is determined in advance by a PCRF entity with an EPC network or is determined by an applications developer or a wireless device manufacturer. For example, a mobile device may negotiate the establishment of one or more EPS bearers with a core network, each EPS bearer being associated with a given QoS or latency requirement. The QoS or latency requirement may be a function of a user subscription or entitlement or alternatively, an applications publisher may include metadata that describes the latency characteristics of the application and this may be used during the negotiation process.

As a further alternative, the wireless device may develop a model (statistical or otherwise) for the traffic behavior of an application. The model then may be used to dynamically assign traffic from the application to the first logical channel or the second logical channel.

The wireless device formulates a joint status based upon the first activity status and the second activity status (1150). The joint status may uniquely define a particular combination values for the first and second status indicators. The wireless device selects (1160) one or more DRX-related parameter values, for example an inactivity timer such as drx-InactivityTimer 708a based upon the determined joint status in step 1150. The one or more DRX-related parameter values are used by wireless device to adjust or adapt a pattern of reception activity related to the communications interface between the mobile device and the network. For example, if the wireless device determines that a first logical channel associated with a Voice-over-Internet Protocol (VOIP) is active, the wireless device may set the inactivity timer to a first value that supports the latency requirements of the VOIP application. The wireless device sets the inactivity timer used by the communications interface to a second value in response to determining that the VOIP application is inactive. This enables the device to improve a battery consumption characteristic whenever latency-sensitive applications are not running. Thus, if low latency applications are not being used and an application relying only on background communications is being used, the inactivity timer may be set to support only the application with the background communications and to thereby improve power consumption of the mobile device.

An example of the drx-InactivityTimer values used for the inactivity timer is shown below in Table 1.

TABLE 1

| LgCH #1 (low latency req) | LgCH #2 (best effort) | drx-Inactivity Timer | Comments |
|---|---|---|---|
| Inactive | Inactive | 60 ms or 300 ms | Both are inactive, choice depends on policy |
| Inactive | Active | 60 ms | Optimise for battery savings, latency not critical |
| Active | Inactive | 300 ms | Optimise for latency, battery saving less important |
| Active | Active | 300 ms | Optimise for latency, battery |

Although one or more parameters are described as relating, reflecting, or representing an activity status, a communications interface may be programmed to automatically generate these status indicators and/or parameters (e.g., the value for a drx-Inactivity Timer). For example, control logic for a communications interface may automatically analyze and link the traffic to a control buffer so that traffic characterization information is readily available. The traffic characterization may be available for quick reference in the form of one or more activity status or flags.

In one configuration, a table is created, populated and maintained to facilitate DRX parameter configurations or reconfigurations that are performed in response to monitoring a communications interface that includes at least two logical channels. The table may include a DRX parameter value associated with each of the logical channels. For example, UE may be programmed to use a specified table in managing DRX configurations. The DRX parameter may be maintained to support the most stringent of the QoS requirements of those logical channels determined to have active status. Thus, where a latency-sensitive voice application and a messaging application both use different channels to support very stringent and less stringent requirements, respectively, the UE may be configured to support the very stringent requirement for the latency-sensitive voice application. A DRX parameter comprising an inactivity timer may be set to be the longest inactivity timer of any logical channel determined to have active status.

Although in some cases, the reception pattern controlling parameter (e.g., the DRX parameter) is an inactivity timer, other reception pattern controlling parameters may alternatively or additionally be maintained to reflect and support parameters that include data rate, delay tolerances, and jitter. There may be a reception pattern controlling parameter for each logical channel.

The transition to a new DRX parameter value may be triggered by an activity or other characteristic or statistic of a traffic flow. For example, a network may be monitoring a particular statistic of a traffic flow and comparing the particular statistic to a threshold. When the particular statistic reaches the threshold, the DRX parameter value may be reconfigured to support a new operating mode or new reception pattern of a mobile device. The new parameter value may be adjusted or set on a dynamic basis to reflect the QoS requirements or needs of a logical channel contributing to the underlying traffic flow that triggered the new operating mode. In one configuration, the transition to the new operating mode is inferred, that is, reflecting the fact that both the UE and the network are looking at the same underlying traffic and monitoring the same statistic. Thus, the UE and the network can transition without exchanging an explicit control plane message to update the DRX parameter value based on their analysis of the same underlying traffic that triggered the transition. In another configuration, the transition to a new operating mode (e.g., new DRX parameter value) may include an exchange of one or more explicit control plane messages. For example, a control plane message with the new DRX parameter value may be exchanged in response to a network determining that an improved communication (such as an improved latency characteristic of a traffic flow) is required or an improved UE battery efficiency (such as may be achieved via use of a new UE reception pattern) is possible. Alternatively, a control plane message with the new DRX parameter value may be exchanged in response to determining that the UE is operating in an environment where the network and the UE are experiencing difficulties in synchronizing.

The DRX parameters or parameter values associated with a particular logical channel may be static or dynamic. For example, in one configuration, channel 0 is always assigned to support the most stringent requirements while channel 2 is always assigned to support the least stringent requirements.

In one configuration, an active communication session is detected. For example, a configurations interface may send or receive packets. A source for the active communications session is identified. The source may include an identification of a messaging application or a streaming media player. The source is associated with either the first logical channel or the second logical channel. Identifying the source for the active communications session may include looking up the source in a table that indicates whether the source should be associated with the first logical channel or the second logical channel. For example, the table may include may indicate that messaging applications should use a channel configured to conserve battery use while a streaming media application should use a low-latency channel. Determining the first state may include determining that a low latency requirement for the first logical channel is present (e.g., a messaging application is attempting to communicate). Determining the second state may include determining that a best effort requirement for the second logical channel is present (e.g., a streaming media player is attempting to communicate).

The implementations and the functional operations described in this document can be implemented in digital electronic circuitry, or in computer software, firmware, or hardware, including the structures disclosed in this document and their structural equivalents, or in combinations of one or more of them. The disclosed and other implementations can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations, but rather as descriptions of features specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

In one sense, user equipment may monitor a communications interface that includes at least two logical channels. Based on monitoring the communications interface, activity states for each of the at least two logical channels are determined, and a value of a DRX parameter used by the communications interface is set in response to the activity states of the at least two logical channels.

Implementations may include one or more of the following features. For example, a DRX parameter value may be associated with each of the logical channels. The user equipment may map a combination of the activity states of the logical channels to a DRX parameter value. The at least two logical channels may include at least two radio bearers. The setting may include implicitly setting the DRX parameter value without communication with the network or explicitly communicating with the network in order to set the DRX parameter value.

In another general sense, a Discontinuous Reception (DRX) parameter value may be adapted by monitoring a plurality of logical channels associated with a communication between a wireless communication device and a network, identifying an activity state for two or more logical channels within the plurality of logical channels, applying a first value for the DRX parameter based upon identifying a first activity state for the two or more logical channels and applying a second value for the DRX parameter based upon identifying a second activity state for the two or more logical channels, wherein the value of the DRX parameter affects a reception pattern of the wireless communication device.

In yet another implementation, a communications interface on a wireless device may be managed by monitoring, on a wireless device, a communications interface that includes at least a first logical channel and a second logical channel, determining, based on monitoring the communications interface, a first activity state for the first logical channel, determining, based on monitoring the communications interface, a second activity state for the second logical channel, and setting a reception pattern parameter used by the communications interface in response to both the first activity state and the second activity state.

Monitoring the communications interface may include detecting an active communication session, identifying a source for the active communications session, and associating the source with either the first logical channel or the second logical channel.

Identifying the source for the active communications session may include monitoring for a pattern of communications from the source, and categorizing the pattern as being associated with the first logical channel or the second logical channel. Identifying the source for the active communications session may include looking up the source in a table that indicates whether the source should be associated with the first logical channel or the second logical channel. Determining the first state may include determining that a low latency requirement for the first logical channel is present.

Determining the second state may include determining that a best effort requirement for the second logical channel is present. Setting the reception pattern parameter used by the communications interface to the first value may include setting a drx-InactivityTimer to provide low latency responsiveness for latency-sensitive communications. Setting the reception pattern parameter used by the communications interface to the second value may include setting a drx-InactivityTimer to provide increased battery duration.

In still another example, user equipment may include memory configured to store an identifier and at least one processor. The processor is configured to monitor a communications interface that includes at least two logical channels, determine, based on monitoring the communications interface, an activity state for each of the at least two logical channels, and set a value of a DRX parameter used by the communications interface in response to the activity states of the at least two logical channels.

In yet another example, user equipment may include memory configured to store an identifier and at least one processor. The processor is configured to monitor a plurality of logical channels associated with a communication between a wireless communication device and a network, identify an activity state for two or more logical channels within the plurality of logical channels, and apply a first value for a DRX parameter value based upon identifying a first plurality of activity states for the two or more logical channels and applying a second value for the DRX parameter based upon identifying a second plurality of activity states for the two or more logical channels, wherein the DRX parameter value affects a reception pattern of the wireless communication device.

In another example, a base station monitors a communications interface that includes at least two logical channels. Based on monitoring the communications interface, activity states for each of the at least two logical channels are determined and a value of a DRX parameter used by the communications interface is set in response to the activity states of the at least two logical channels. A DRX parameter value may be associated with each of the logical channels. A combination of the activity states of the logical channels may be mapped to a DRX parameter value. A most stringent DRX parameter value may be selected amongst the set of logical channels determined to have an active state. Setting of the value of the DRX parameter value may include determining the active logical channel having a most stringent latency requirement, and setting the value of the DRX parameter to a value associated with the latency requirement of the determined active logical channel.

Each of the at least two logical channels may include a radio bearer. The setting may include automatically setting the DRX parameter value without communication with a user equipment. The setting may include explicitly communicating with a user equipment in order to set the DRX parameter value. A wireless network node may be configured to monitor a communications interface that includes at least two logical channels, determine, based on monitoring the communications interface, activity states for each of the at least two logical channels, and set a value of a DRX parameter used by the communications interface in response to the activity states of the at least two logical channels.

Only a few examples and implementations are disclosed. Variations, modifications, and enhancements to the described examples and implementations and other implementations can be made based on what is disclosed.

What is claimed is:

1. A method comprising:
monitoring, on a user equipment, a communications interface that includes at least two logical channels;
determining, based on monitoring the communications interface, activity states for each of the at least two logical channels; and
setting a value of a discontinuous reception (DRX) parameter used by the communications interface in response to the activity states of the at least two logical channels, wherein the setting comprises implicitly setting the DRX parameter value without communication with a network.

2. The method of claim 1, further comprising:
associating a DRX parameter value with each of the at least two logical channels.

3. The method of claim 1, further comprising:
mapping a combination of the activity states of the at least two logical channels to a DRX parameter value.

4. The method of claim 1, wherein the at least two logical channels comprise at least two radio bearers.

5. A method of adapting a discontinuous reception (DRX) parameter value, the method comprising:

monitoring a plurality of logical channels associated with a communication between a wireless communication device and a network;
identifying an activity state for two or more logical channels within the plurality of logical channels; and
applying a first value for the DRX parameter based upon identifying a first activity state for the two or more logical channels and applying a second value for the DRX parameter based upon identifying a second activity state for the two or more logical channels, wherein the DRX parameter affects a reception pattern of the wireless communication device.

6. A method of managing a communications interface on a wireless device, the method comprising:
monitoring, on the wireless device, a communications interface that includes at least a first logical channel and a second logical channel;
determining, based on monitoring the communications interface, a first activity state for the first logical channel;
determining, based on monitoring the communications interface, a second activity state for the second logical channel; and
setting a reception pattern parameter used by the communications interface in response to both the first activity state and the second activity state.

7. A user equipment, comprising:
at least one processor configured to:
monitor a communications interface that includes at least two logical channels;
determine, based on monitoring the communications interface, an activity state for each of the at least two logical channels; and
set a value of a discontinuous reception (DRX) parameter used by the communications interface in response to the activity states of the at least two logical channels, wherein the setting comprises implicitly setting the DRX parameter value without communication with a network.

8. A user equipment, comprising:
at least one processor configured to:
monitor a plurality of logical channels associated with a communication between a wireless communication device and a network;
identify an activity state for two or more logical channels within the plurality of logical channels; and
apply a first value for a discontinuous reception (DRX) parameter based upon identifying a first plurality of activity states for the two or more logical channels and applying a second value for the DRX parameter based upon identifying a second plurality of activity states for the two or more logical channels, wherein the DRX parameter affects a reception pattern of the wireless communication device.

9. A method comprising:
monitoring, at a base station, a communications interface that includes at least two logical channels;
determining, based on monitoring the communications interface, activity states for each of the at least two logical channels;
selecting a maximum or minimum discontinuous reception (DRX) parameter value amongst the set of logical channels determined to have an active state; and
setting a value of a DRX parameter used by the communications interface to the selected DRX parameter value.

10. The method of claim 9, further comprising:
associating a DRX parameter value with each of the at least two logical channels.

11. A method comprising:
monitoring, at a base station, a communications interface that includes at least two logical channels;
determining activity states for each of the at least two logical channels;
selecting an active logical channel having a most stringent latency requirement; and
setting a discontinuous reception (DRX) parameter to a value associated with the latency requirement of the selected active logical channel.

12. The method of claim 9, wherein each of the at least two logical channels comprise a radio bearer.

13. The method of claim 9, wherein the setting comprises automatically setting the DRX parameter value without communication with a user equipment.

14. The method of claim 9, wherein the setting comprises explicitly communicating with a user equipment in order to set the DRX parameter value.

15. A computer-implemented method of managing a communications interface on a base station, the method comprising:
monitoring, on the base station, a communications interface that includes at least a first logical channel for a first application and a second logical channel for a second application;
determining, based on monitoring the communications interface, a first state for the first logical channel;
determining, based on monitoring the communications interface, a second state for the second logical channel;
setting an inactivity timer used by the communications interface to a first value in response to determining that the first state indicates that the first logical channel is active; and
setting the inactivity timer used by the communications interface to a second value in response to determining that the second state indicates that the second logical channel is active and the first logical channel is inactive.

16. The method of claim 15 wherein monitoring the communications interface includes:
detecting an active communication session;
identifying a source for the active communications session; and
associating the source with either the first application or the second application.

17. A wireless network node configured to:
monitor a communications interface that includes at least two logical channels;
determine, based on monitoring the communications interface, activity states for each of the at least two logical channels; and
set a value of a discontinuous reception (DRX) parameter used by the communications interface in response to the activity states of the at least two logical channels, wherein the setting comprises implicitly setting the DRX parameter value without communication with a user equipment.

* * * * *

UNITED STATES PATENT AND TRADEMARK OFFICE
CERTIFICATE OF CORRECTION

PATENT NO.       : 8,611,240 B2  
APPLICATION NO.  : 12/946535  
DATED            : December 17, 2013  
INVENTOR(S)      : Anderson et al.

Page 1 of 1

It is certified that error appears in the above-identified patent and that said Letters Patent is hereby corrected as shown below:

On the Title Page, Item [75], Delete "Shipston-on-Sour (GB);" and insert
-- Shipston-on-Stour (GB); -- therefor.

Signed and Sealed this
Twenty-first Day of October, 2014

Michelle K. Lee
*Deputy Director of the United States Patent and Trademark Office*